United States Patent
Granzow et al.

(10) Patent No.: US 9,131,419 B2
(45) Date of Patent: Sep. 8, 2015

(54) SYSTEMS AND METHODS FOR INTER-RADIO ACCESS TECHNOLOGY (RAT) MOBILITY

(75) Inventors: Wolfgang Granzow, Heroldsberg (DE); Xipeng Zhu, Beijing (CN); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 14/002,406

(22) PCT Filed: Apr. 2, 2011

(86) PCT No.: PCT/CN2011/072424
§ 371 (c)(1),
(2), (4) Date: May 2, 2014

(87) PCT Pub. No.: WO2012/135994
PCT Pub. Date: Oct. 11, 2012

(65) Prior Publication Data
US 2014/0235242 A1     Aug. 21, 2014

(51) Int. Cl.
H04W 36/00 (2009.01)
H04W 36/14 (2009.01)
H04W 48/00 (2009.01)
H04W 60/04 (2009.01)

(52) U.S. Cl.
CPC .............. *H04W 36/14* (2013.01); *H04W 48/17* (2013.01); *H04W 60/04* (2013.01)

(58) Field of Classification Search
USPC .................. 455/435.1–435.3, 436–444, 448; 370/331
See application file for complete search history.

(56) References Cited

U.S. PATENT DOCUMENTS

2011/0044264 A1    2/2011   Chen et al.
2011/0045826 A1*   2/2011   Kim et al. .................. 455/426.1
2012/0094643 A1*   4/2012   Brisebois et al. ............. 455/418

FOREIGN PATENT DOCUMENTS

CN      101296481 A    10/2008
JP      2010068233 A    3/2010
WO      2010092049 A1   8/2010

OTHER PUBLICATIONS

International Search Report and Written Opinion—PCT/CN2011/072424—ISA/EPO—Dec. 22, 2011.
Research in Motion: "UE information for RFSP facilitated selective camping to enhance user CSFB experience", 3GPP TSG SA WG2 Meeting #76, S2-097053, Nov. 20, 2009, pp. 1-4.
Research in Motion UK Ltd, et.al., "Introduction of indicator to permit reselection back to E-UTRAN at completion of a CSFB call", 3GPP TSG RAN WG2 Meeting #69, R2-101443, Feb. 26, 2010, pp. 1-8.
Samsung: "Re-enabling E-UTRAN capability for voice centric UEs", 3GPP TSG SA WG2 Meeting #77, S2-100322, Jan. 22, 2010, pp. 1-3.
Samsung: "Voice/Data centric and selective camping", 3GPP TSG SA WG2 Meeting #79, S52-102420, May 14, 2010, pp. 1-8.

* cited by examiner

*Primary Examiner* — Brandon Miller
(74) *Attorney, Agent, or Firm* — François A. Pelaez

(57) ABSTRACT

Methods and apparatus for providing inter-RAT mobility between 2G/3G and 4 networks are described. A UE camped or connected to a GERAN or UTRAN network may be configured to move, either directly or through network-controlled functions, to an LTE network to perform a data call. The UE may then return to a 2G/3G network.

30 Claims, 22 Drawing Sheets

Example Circuit Switched Fallback (CSFB) Procedures In Various Application Scenarios Example Packet Switched (PS) Escalation
Procedures In Various Application Scenarios Example Logical Information Exchange During Attach/TAU/RAU Procedures Example Connection Workflow With Application Triggered Change of Operational Mode and LTE Cell Selection

*Example Process Corresponding with Diagram of FIG. 8*

Example Connection Workflow Where Network Provides Voice Domain Preferences with Authorization for UE to Move to LTE for Data Call

*Example Process Corresponding with Diagram of FIG. 10*

*Example Process Corresponding with Diagram of FIG. 10*

Example Where UE Moves to E-UTRAN Without NAS Level Signaling Using CAUSE Data

Example Process Corresponding with Diagram of FIG. 13

*Example Process Corresponding with Diagram of FIG. 11*

Example RRC Release-Based Packet Switched Escalation Procedure

*Example PSHO Based PS Escalation Procedure*

SYSTEMS AND METHODS FOR INTER-RADIO ACCESS TECHNOLOGY (RAT) MOBILITY

FIELD

This application is directed generally to wireless communications systems. More particularly, but not exclusively, the application relates to systems, apparatus, and methods for providing inter-Radio Access Technology (RAT) mobility between 2G/3G networks such as GERAN and UTRAN networks and 4G networks, such as LTE networks.

BACKGROUND

Wireless communication systems are widely deployed to provide various types of communication content such as voice, data, video, and the like, and deployments are likely to increase with introduction of new data oriented systems such as Long Term Evolution (LTE) systems. Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and other orthogonal frequency division multiple access (OFDMA) systems.

Generally, a wireless multiple-access communication system can simultaneously support communication for multiple wireless terminals (also know as user equipments (UEs), user terminals, or access terminals (ATs)). Each terminal communicates with one or more base stations (also know as access points (APs), EnodeBs, or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via single-in-single-out, single-in-multiple out, multiple-in-single-out, or multiple-in-multiple-out (MIMO) systems.

A feature of interest in many communication systems is multimode operation. In multimode operation, communication devices, such as user terminals, may be configured to operate on different types of communication networks that use different Radio Access Technologies (RATs) and Radio Access Networks (RANs). In some cases, user terminals or other communication devices may be redirected from one network supporting a first technology to a second network supporting a different technology.

For example, some LTE networks may not support voice connections, or in some cases, an operator may wish to locate a voice-oriented device on a 2G or 3G network or move a voice connection to another network under their control or coordination for various reasons, such as mobility, loading, usage type, or other reasons.

In one case, in an LTE system, which is data-centric, an operator may wish to move a user attempting to make a voice call to another network that supports a different technology, such as Circuit Switched (CS) connections. Alternately, the operator may wish to move a user receiving an incoming voice call. For example, the operator may wish to redirect a user from an LTE network and associated cells to another network, such as a UTRAN or GERAN network (e.g., a network that natively supports CS connections), using a procedure know as Circuit Switched Fallback (CSFB), which is described in, for example, 3GPP TS 23.272. In some cases, a user may wish to perform simultaneous voice and data communications, but redirection to other networks may create problems for simultaneous voice and data operation.

In other cases, an operator may direct a user to a user with an LTE capable device to a 2G or 3G network if the device is configured to be voice centric or the carrier prioritizes the device to use a 2G or 3G network.

SUMMARY

This disclosure relates generally to wireless communication systems. More particularly, but not exclusively, the application relates to systems, apparatus, and methods for providing inter-Radio Access Technology (RAT) mobility between 2G/3G networks such as GERAN and UTRAN networks and 4G networks, such as LTE networks.

For example, in one aspect, the disclosure relates to a method for providing inter-radio access technology (RAT) mobility in a wireless communication system. The method may include, for example, camping a user terminal in an Idle mode in a first wireless network cell, wherein the first wireless network is a GERAN or UTRAN network. The first wireless network cell may be a 2G or 3G network cell. The method may further include changing, based on an application executing on the user terminal, a user terminal usage mode from a Voice Centric mode to a Data Centric mode, and initiating a Routing Area Update (RAU) procedure from the user terminal. The RAU procedure may include providing information associated with the usage mode change from the user terminal and receiving new Cell Priority Information from the wireless network. The method may further include selecting an E-UTRAN cell and performing data communications associated with the application with a base station of the E-UTRAN cell.

In another aspect, the disclosure relates to a method for providing inter-radio access technology (RAT) mobility in a wireless communication system. The method may include, for example, camping a user terminal in an Idle mode in a first wireless network cell, wherein the first wireless network is a GERAN or UTRAN network, and receiving new Cell Priority Information including authorization to move to an E-UTRAN cell for a predefined class of data calls. The Cell Priority Information may define, based on a carrier-preference, a priority or limitation on cell types accessible by the user terminal. The method may further include receiving a trigger from an application executing on the user terminal to initiate the data call, and disregarding an assigned cell priority based on the new Cell Priority Information. The new Call Priority information may authorize escalation of service for the user terminal from a 2G or 3G network to a 4G network, such as an LTE network. The process may further include selecting an E-UTRAN network cell and establishing a connection with a base station of the E-UTRAN network. The method may further include performing data communications associated with the application on the selected E-UTRAN cell.

In another aspect, the disclosure relates to a method for providing inter-radio access technology (RAT) mobility in a wireless communication system, The method may include, for example, camping a user terminal in an Idle mode in a first wireless network cell, wherein the first wireless network is a GERAN or UTRAN network. The method may further include receiving, from an application executing on the user terminal, a trigger for a data call, determining a suitable E-UTRAN network cell, and sending a request message to the first wireless network including a Cause Indicator for a data call. The method may further include receiving, from the first wireless network, a release message with redirection information to the E-UTRAN network cell.

In another aspect, the disclosure relates to non-transitory computer-readable media including instructions to implement the above-described methods, in whole or in part.

In another aspect, the disclosure relates to systems, devices, and apparatus to perform the above-described methods, in whole or in part.

In another aspect, the disclosure relates to means for performing the above-described methods, in whole or in part.

Additional aspects, features, and functionality are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1A:
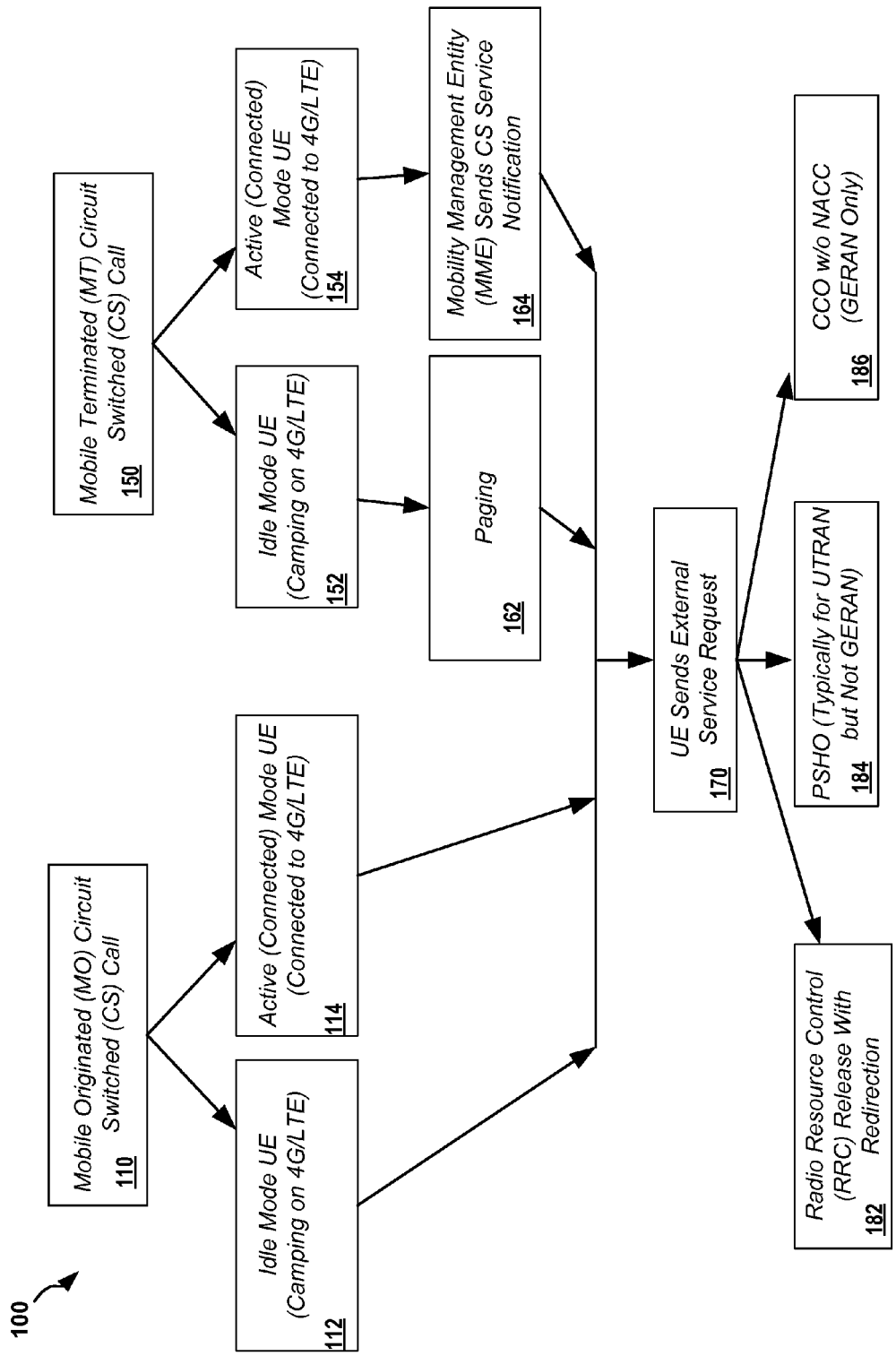
FIG. 1A illustrates details of Circuit Switched Fallback (CSFB) procedures for various call scenarios.

Various aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

This disclosure relates generally to coordination and management of operation in wireless communication systems, such as a multimode communication system. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, GSM networks, as well as other communications networks. As described herein, the terms "networks" and "systems" may be used interchangeably.

A CDMA network may implement a radio technology such as Universal Terrestrial Radio Access (UTRA), cdma2000, and the like. UTRA includes Wideband-CDMA (W-CDMA) and Low Chip Rate (LCR). Cdma2000 covers IS-2000, IS-95, and IS-856 standards.

A TDMA network may implement a radio technology such as Global System for Mobile Communications (GSM). 3GPP defines standards for the GSM EDGE (Enhanced Data Rates for GSM Evolution) Radio Access Network (RAN), also denoted as GERAN. GERAN is the radio component of GSM/EDGE, together with the network that joins the base stations (for example, the Ater and Abis interfaces) and the base station controllers (A interfaces, etc.). The radio access network represents a key component of a GSM network, through which phone calls and packet data are routed from and to the Public Switched Telephone Network (PSTN) and Internet to and from subscriber handsets, also knows as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different Radio Access Technologies (RATs) and Radio Access Networks (RANs).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations or in an LTE-centri way, and LTE terminology is used in much of the description below; however, the description is not intended to be limited to LTE applications. Accordingly, it will be apparent to one of skill in the art that the systems, apparatus and methods described herein may be applied to other communications systems and applications.

Logical channels in wireless communication systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information, and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH), and a Paging Channel (PCH). The PCH may be used for support of UE power saving (for example, when a Discontinuous Reception (DRX) cycle is indicated by the network to the UE), broadcast over an entire cell and mapped to Physical Layer (PHY) resources which can be used for other control/traffic channels. The UL Transport Channels may include a Random Access Channel (RACH), a Request Channel (REQCH), an Uplink Shared Data Channel (UL-SDCH), and a plurality of PHY channels. The PHY channels may include a set of DL channels and UL channels.

The DL PHY channels may include the following:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels may include the following:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

The word "exemplary" is used herein to mean "serving as an example, instance, or illustration." Any aspect and/or embodiment described herein as "exemplary" is not necessarily to be construed as preferred or advantageous over other aspects and/or embodiments.

For purposes of explanation of various aspects and/or embodiments, the following terminology and abbreviations may be used herein:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast broadcast single frequency network
MCE MBMS coordinating entity
MCH Multicast channel
DL-SCH Downlink shared channel
MSCH MBMS control channel
PDCCH Physical downlink control channel
PDSCH Physical downlink shared channel LTE systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

3GPP Specification 36211-900 defines in Section 5.5 particular reference signals for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot, and the like. A UE-specific reference signal may also be referred to as a dedicated reference signal.

TABLE 1

| Link | Reference Signal | Description |
| --- | --- | --- |
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, HIPERLAN-2, DVB, and DAB.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as described above. In particular, the physical downlink control channel (PDCCH) is used for sending control, the physical hybrid ARQ indicator channel (PHICH) for sending ACK/NACK, the physical control format indicator channel (PCFICH) for specifying the number of control symbols, the Physical Downlink Shared Channel (PDSCH) for data transmission, the Physical Multicast Channel (PMCH) for broadcast transmission using a Single Frequency Network (SFN), and the Physical Broadcast Channel (PBCH) for sending important system information within a cell. Supported modulation formats on the PDSCH in LTE are QPSK, 16QAM, and 64QAM. Various modulation and coding schemes are defined for the various channels in the 3GPP specifications.

In the uplink there are typically three physical channels. While the Physical Random Access Channel (PRACH) is only used for initial access and when the UE is not uplink synchronized, the data is sent on the Physical Uplink Shared Channel (PUSCH). If there is no data to be transmitted on the uplink for a UE, control information would be transmitted on the Physical Uplink Control Channel (PUCCH). Supported modulation formats on the uplink data channel are QPSK, 16QAM, and 64QAM.

If virtual MIMO/spatial division multiple access (SDMA) is introduced, the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

CS Fallback Overview

3GPP describes configurations for implementing CS Fallback (CSFB) in the Specification, such as, for example, 3GPP TS 23.272. The SGS interface is described in 3GPP TS 29.118. Additional aspect of CSFB are described in 3GPP TS 23.401. Each of these documents are incorporated by reference herein.

CSFB can be performed in various ways depending on the state of the user terminal or UE, such as whether the UE is in an idle or connected states, whether an associated Circuit Switched (CS) domain service is mobile originated (MO call) or mobile terminated (MT call), or other state conditions. CS domain services generally refer to voice services, although it may also be used to reference CS domain data services such as video or CS multimedia.

FIG. 1A illustrates various examples of CS fallback cases in diagram 100. The core part of the CSFB procedure in each of these cases begins with the sending of a Non-Access Stratum (NAS) Extended Service Request (ESR) message from a user terminal (UE) to a Mobility Management Entity (MME) via E-UTRAN (assuming the UE is operating in a 4G network such as E-UTRAN/LTE).

Upon reception of the ESR message at the MME, the MME can decide between the different procedures shown in FIG. 1A based on support provided by the network and UE. As defined in TS 23.272, three primary types of core CSFB procedures include 1) Radio Resource Control (RRC) based; 2) Packet Switched (PS) Handover (PSHO) based; and 3) Cell Change Order (CCO) based, either with or without network assistance (NACC).

CCO without NACC base CSFB applies to A/Gb based GERAN networks only. Use of PSHO based CSFB requires both the network and the UE to support PS handover to the respective Radio Access Technology (RAT), however, PSHO is not typically supported in GERAN networks. Both RRC release and PSHO based CSFB have different varieties, based on the RAT used for the CS domain and the UE and network capabilities.

For example, as shown in FIG. 1A, A UE originated MO CS call at stage 110 from a UE in Idle Mode Camping on an E-UTRAN/LTE cell at stage 112 or from a connected mode UE at stage 114 to the network may result in the UE sending an external service request at stage 170. Similarly, for an incoming MT CS call at stage 150, to a UE camping on a 4G/LTE network at stage 152, paging may be done at stage 162. Likewise, the UE is in connected (active) mode and receives an MT call, the MME may send a CS Service Notification at stage 164.

In each of these cases, the UE may send an external service request at stage 170, resulting in various actions depending on the UE and network configuration. For example, an RRC Release with redirection may be provided at stage 182. Alternately, a PSHO (typically for a UTRAN network) or CCO without NACC (for GERAN networks) may be provided at stages 184 and 186, respectively.

Service Domain Selection Overview

Service-domain selection for CSFB-capable user terminals/UEs supporting E-UTRAN and GERAN or UTRAN, providing selection of RATs between the PS and CS domains are described in the 3GPP Specifications and in particular in 3GPP TS 23.221, incorporated by reference herein. This specification describes, among other features, control of UE behavior at initial registration and location updates, such as during UE mobility.

In summary, the UE may be provided, via Open Mobility Alliance (OMA) Device Management (DM) or OMA DM, with configuration settings that describe the Home Public Land Mobile Network (HPLMN) operator's (also denoted subsequently herein as "operator" for brevity) preferences for voice services. The operator may select preferences such as:

1) CS Voice Only

2) IMS PS Voice Only

3) CS Voice Preference, with IMS PS Voice Secondary

3) IMS PS Voice Preference, with CS Voice Secondary or other preferences, depending on the operator, network configuration and device configurations. These preferences may also be denoted herein as Cell Priorities, and are typically controlled solely by the operator.

In addition, a user terminal or UE may also be configured, typically by default during manufacture, provision by the operator, and/or by a user, to be "Voice Centric" or "Data Centric." This configuration may also be denoted herein as a UE Operation Mode Setting or Usage Mode Setting. The Usage Mode setting is traditionally assumed to be controlled only by having an initial default setting or by the user of the device, which is generally only done, at most, once by a user. Later settings, such as during device operation by an application or operator/carrier have not been considered in existing devices and systems.

These parameters, as well as other parameters that a UE receives in Attach Accept and TAU/RAU Accept messages govern voice domain (CS vs. PS) RAT selection. In particular, the following indicators are relevant. 1)"IMS Voice Over PS Session Supported" Indication; 2)"SMS Only" Indication; and 3)"CSFB Not Preferred" Indication. Table 1 below summarizes UE behavior with respect to RAT selection in dependence of success or failure of combined Attach/TAU procedure and indicators provided in the Accept messages. For example, a "Voice-Centric" UE tunes to a 2G/3G network when "CSFB Not Preferred" is indicated by the network or when CSFB is not supported (e.g., indication of "SMS only"). In this case, there is no obvious way for the UE to return back to a E-UTRAN/LTE network unless the configuration is changed from "Voice Centric" to "Data Centric."

TABLE 1

UE Behavior Depending on Parameters Provided in Accept Messages

| Attach result | Accept message of combined Attach or TAU | | UE behavior | |
|---|---|---|---|---|
| | SMS only | CSFB not preferred | Voice centric | Data centric |
| Success | — | — | Stay on E-UTRAN, use CSFB | |
| | — | ✓ | Reselect to 2G/3G | Stay on E-UTRAN, use CSFB, (SMS over SGs supported) |
| | ✓ | — | Reselect to 2G/3G | Stay on E-UTRAN, no voice, (SMS over SGs supported) |
| | ✓ | ✓ | Error case | |
| Failure | X | X | Reselect to 2G/3G | Stay on E-UTRAN, no voice |

Selective Idle Mode Camping Overview

Figure 1B:
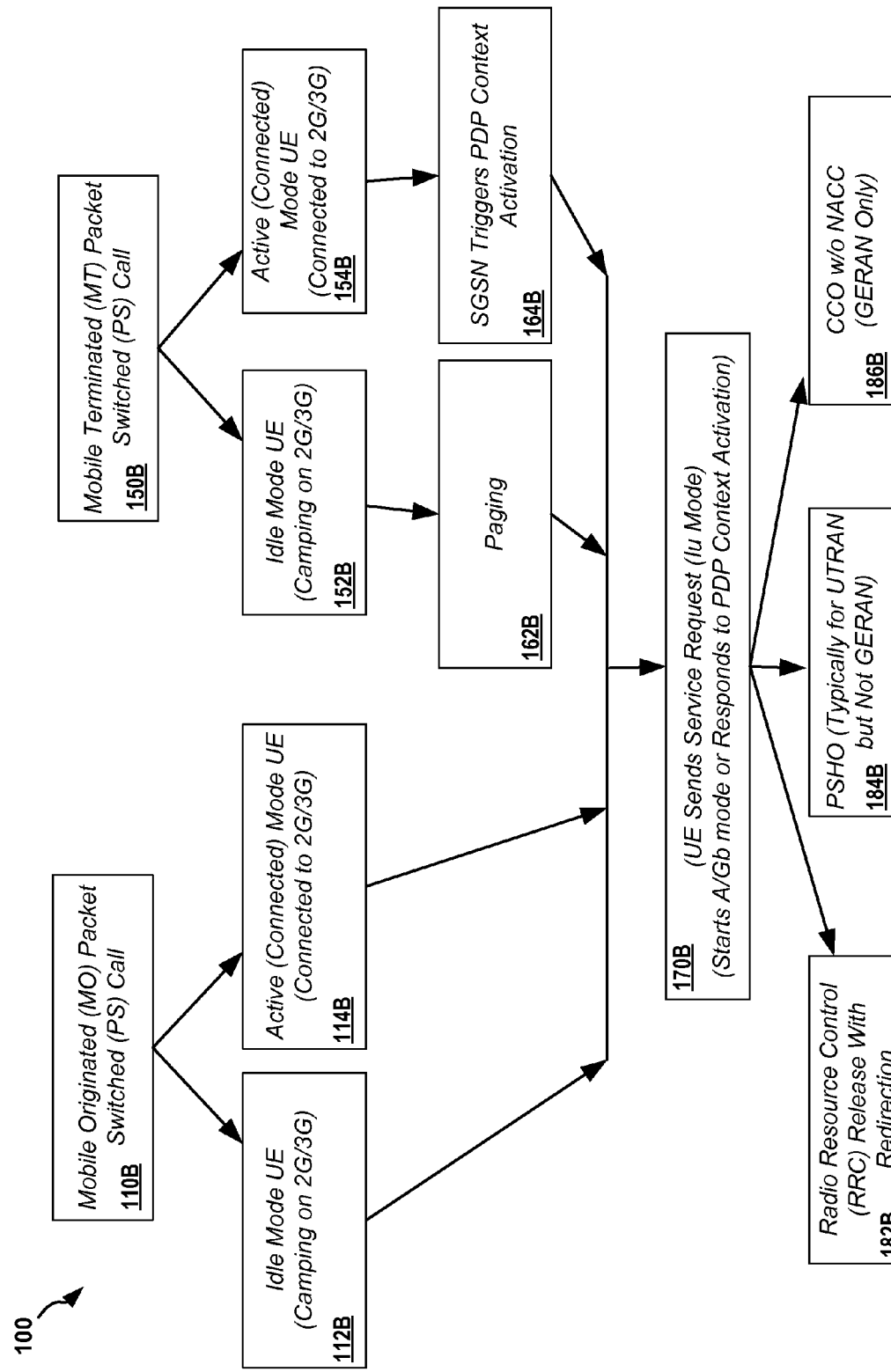
FIG. 1B illustrates details of Packet Switched (PS) Escalation Procedures for analogous to the CSFB procedures illustrated in FIG. 1A, for various call scenarios.
Figure 2:
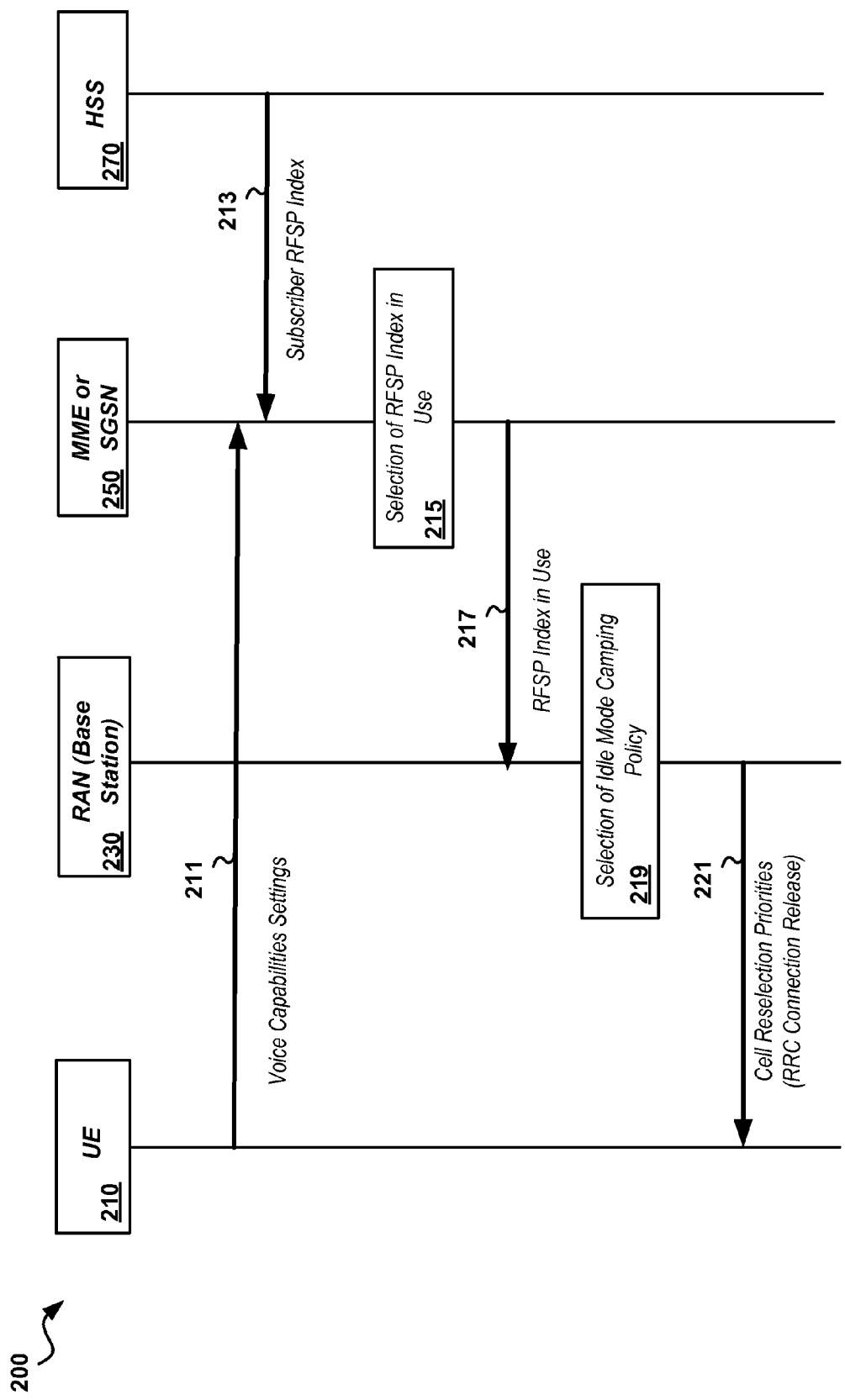
FIG. 2 illustrates details of example logical information exchange during Attach/TAU/RAU procedures.

The concept of "Selective Idle Mode Camping" was introduced in 3GPP Release 9 to improve the user experience for CS voice calls. This function allows an operator to direct UEs configured as "Voice Centric" to camp on 2G/3G networks, such as GERAN and UTRAN networks, in Idle mode as shown in FIG. 1B. FIG. 2 shows an example diagram 200 illustrating the process. Diagram 200 includes example entities UE 210, a base station or RAN 230, an MME or SGSN 250, and an HSS 270. At stage 211, UE 210 may send its voice capabilities (e.g., IMS and/or CS capable, CSFB capability, etc.) and configurations settings (e.g., "Voice Centric" or "Data Centric," IMS/CS voice preferences) to MME or SGSN 250 in Attach/TAU/RAU Request messages. As part of the location updating procedure HSS 270 provides a "Subscriber RFSP Index" as part of other subscription information in an Update Location Ack Message 213 to the MME or SGSN 250. At stage 215, MME/SGSN 250 selects the "RFSP index in use" based on the UE Voice Capabilities/Settings and the "Subscriber RFSP Index" provided by the HSS 270. At stage 217, the "RFSP Index in Use" may be provided from the MME/SGSN 250 to the RAN 230 (e.g., eNB in LTE or BSC/RNC in GERAN/UTRAN). At stage 219, RAN 230 selects the Idle Mode camping policy based on the "RFSP Index in Use" received from MME/SGSN 250 at stage 217. At stage 221, the idle mode mobility information, which includes cell reselection priorities, is sent to UE 210 (e.g., in an RRC Connection Release message or other message).

As used herein, RFSP refers to RAT/Frequency Selection Priority. This term is used by SA2 for the "Subscriber Profile ID for RAT/Frequency Selection Priority" IE as defined in 3GPP TS 36.300, TS 36.331 and TS 25.413. To achieve the desired functionality, the RFSP index selected by MME/SGSN 250 in stage 215 is determined based on knowledge of the UE configuration parameters. For example, for a "Voice Centric" UE, the index can point to a table entry stored in the RAN node 230 that prioritizes 2G/3G cells over 4G/LTE cells.

LTE System Overview

Before describing further aspects and details associated with mobility between 2G/3G networks such as GERAN or UTRAN and 4G Networks such as E-UTRAN/LTE, details of example LTE system and device implementations are further described below.

Figure 3:
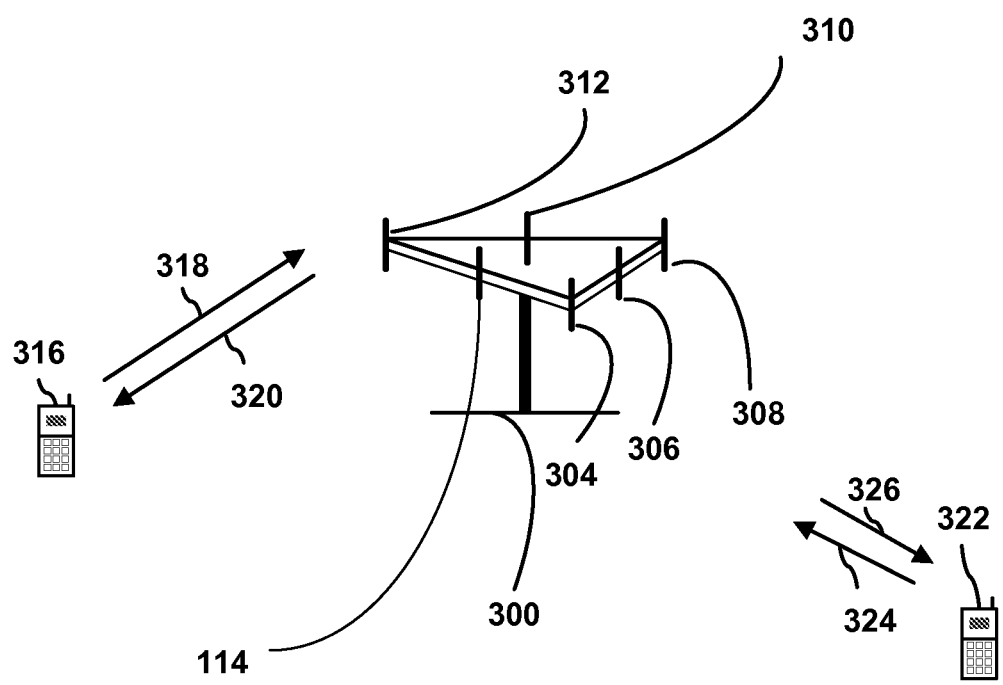
FIG. 3 illustrates details of an example communication system including multiple user terminals and a base station.

For example, FIG. 3 illustrates details of an implementation of a multiple access wireless communication system, which may be an LTE system, on which aspects as further described subsequently may be implemented. A base station such as a Node B (NB) or evolved NodeB (eNB) 300, such as an LTE eNB, may include multiple antenna groups, one including 304 and 306, another including 308 and 310, and an additional including 312 and 314. In FIG. 3, only two antennas are shown for each antenna group; however, more or fewer antennas may be utilized for each antenna group. A multi-RAT capable user terminal or user equipment (UE) 316 (also known as an access terminal or AT) is in communication with antennas 312 and 314, where antennas 312 and 314 transmit information to UE 316 over forward link (also known as a downlink) 320 and receive information from UE 316 over reverse link (also known as an uplink) 318. A second UE 322 may be in communication with antennas 306 and 308, where antennas 306 and 308 transmit information to UE 322 over forward link 326 and receive information from access terminal 322 over reverse link 324. UEs 316 and/or 322 may be configured to communicate with cells and associated base stations in multiple wireless networks, such as GERAN and/or UTRAN networks (not shown in FIG. 3), in addition to LTE networks.

In a frequency division duplex (FDD) system, communication links 318, 320, 324 and 326 may use different frequencies for communication with an RAT. For example, forward link 320 may use a different frequency then that used by reverse link 318. In a time division duplex (TDD) system, downlinks and uplinks may be shared with an RAT.

Each group of antennas and/or the area in which they are designed to communicate is often referred to as a sector of the base station or eNB. Antenna groups each may be designed to communicate to UEs in a sector of the areas covered by eNB 300. In communication over forward links 320 and 326, the transmitting antennas of eNB 300 may utilize beamforming in order to improve the signal-to-noise ratio of forward links for the different access terminals 316 and 322.

Also, an eNB using beamforming to transmit to UEs scattered randomly through its coverage may cause less interference to UEs in neighboring cells than an eNB transmitting through a single antenna to all its UEs. As noted previously, UEs, such as UE 316 and 322, may be further configured to operate with other nodes of other communication networks (not shown), such as, for example, GERAN and/or UTRAN networks. Moreover, base stations, such as eNB 300, may be configured to facilitate handover of served UEs to base stations of the other networks (not shown), such as through use of a redirection command, Circuit Switched Fallback (CSFB) procedure, and/or other mechanisms.

Figure 4:
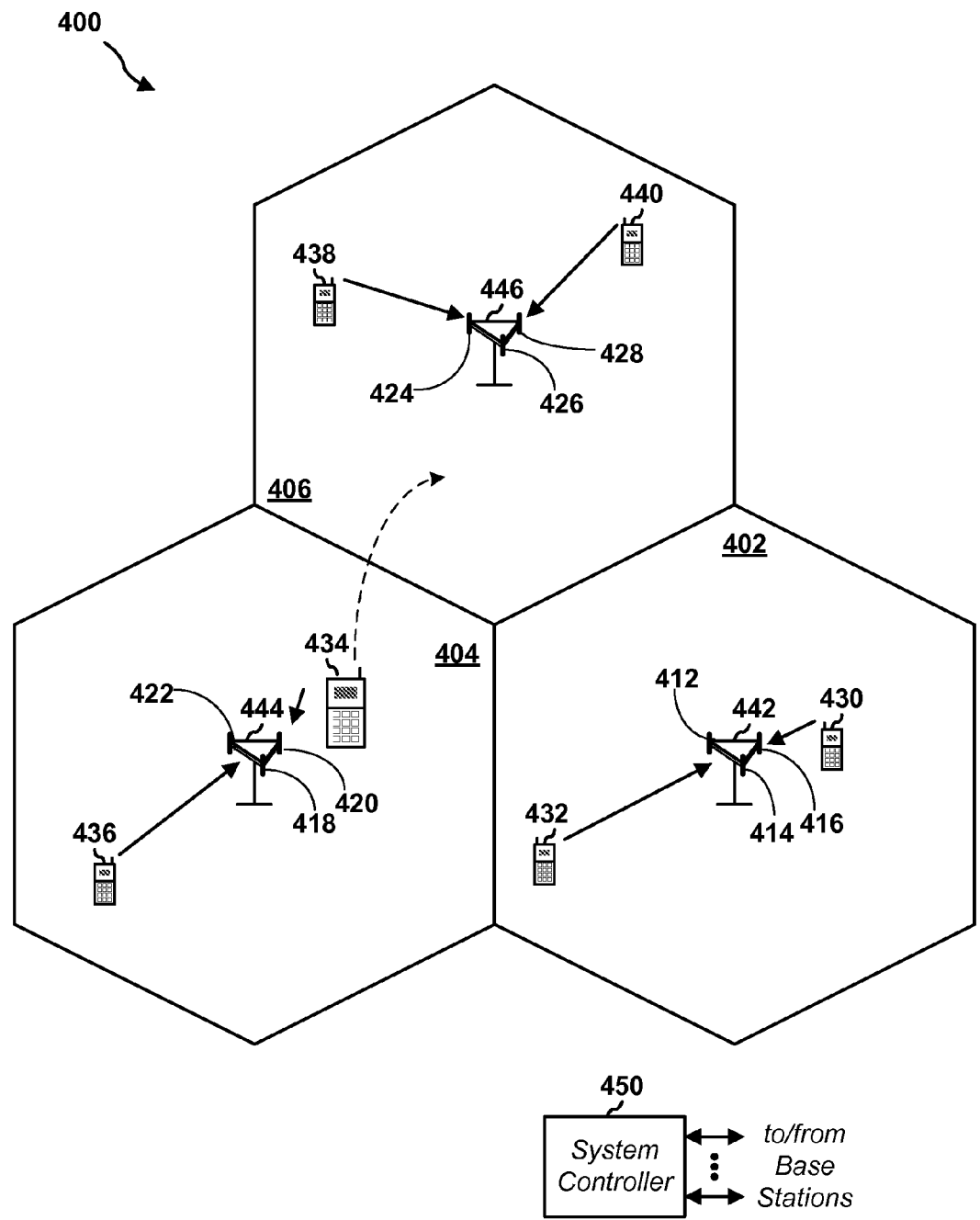
FIG. 4 illustrates details of an example communication system including multiple cells which may use different RATs.

FIG. 4 illustrates details of an implementation of a multiple access wireless communication system 400, such as an LTE system, on which aspects, such as are described subsequently herein, may be implemented. The multiple access wireless communication system 400 includes multiple cells, including cells 402, 404, and 406. These may be cells of a common RAT type, such as LTE cells, and/or may include cells of other RAT types, such as GERAN and/or UTRAN cells. Although cell coverage is shown as being adjacent, coverage areas may overlap, either in whole or in part.

In one aspect, the cells 402, 404, and 406 may include a node B (NB) or enhanced node B (eNB) that includes multiple sectors. The multiple sectors can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 each correspond to a different sector. In cell 206, antenna groups 424, 426, and 428 each correspond to a different sector.

The cells 402, 404, and 406 can include several wireless communication devices, e.g., user equipment or UEs, which can be in communication with one or more sectors of each cell 402, 404, or 406. For example, UEs 430 and 432 can be in communication with eNB 442, UEs 434 and 436 can be in communication with eNB 444, and UEs 438 and 440 can be in communication with eNB 446.

The cells and associated base stations may be coupled to a system controller 450, which may be part of a core or backhaul network or may provide connectivity to a core or backhaul network, including, for example, an MME and SGW, such as may be used to perform functions as further described herein related to multimode coordination and operation, as well as other aspects described herein. The core network may include components under control of a carrier or operator as described in further detail subsequently herein.

Figure 5:
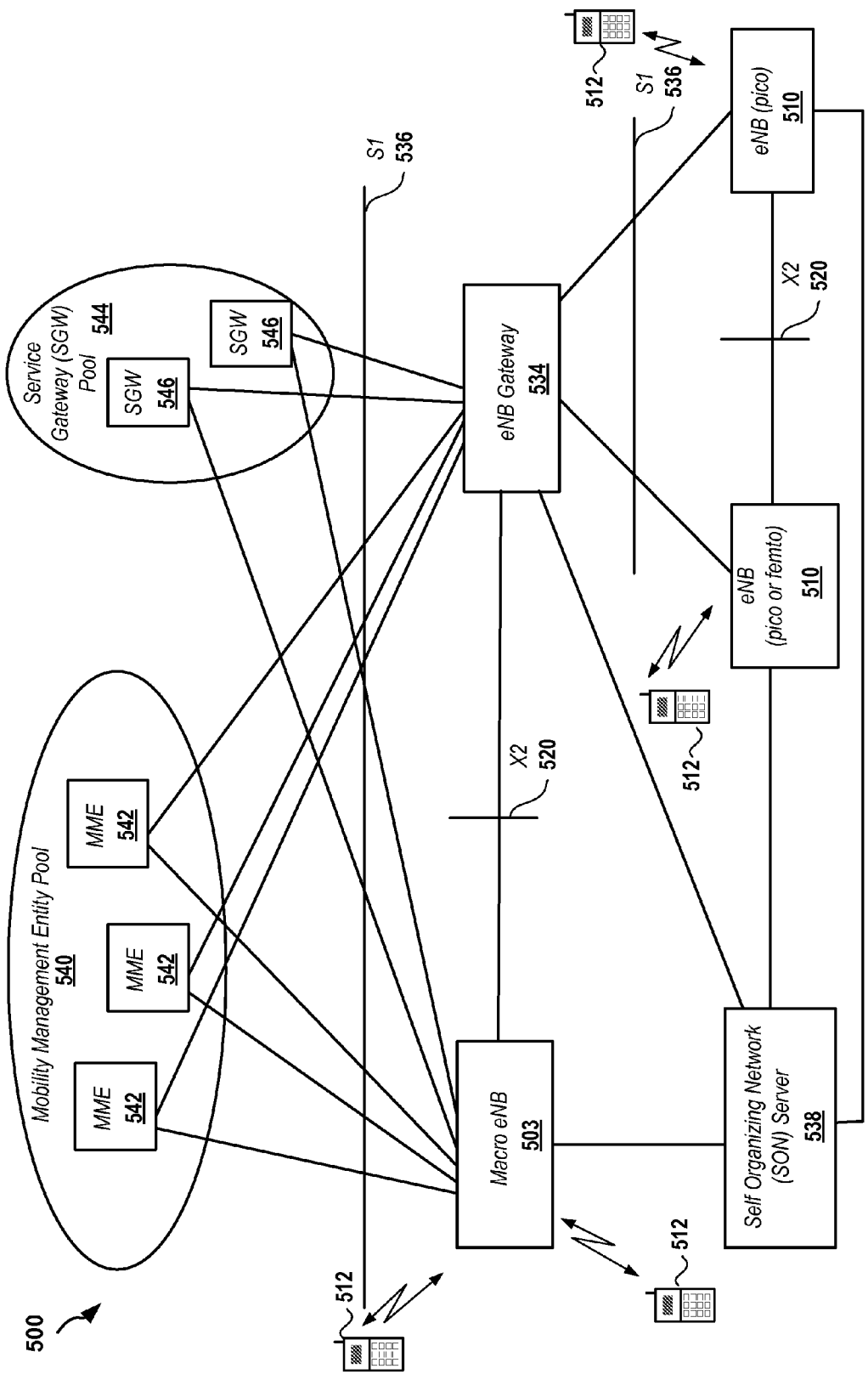
FIG. 5 illustrates details of an example network configuration of nodes in a wireless communications system.

FIG. 5 illustrates details of an example embodiment 500 of connections between various network nodes. Network 500 may include a macro-eNB 502 and/or multiple additional eNBs, which may be, for example, picocell eNBs 510, femtocell eNBs, macrocell eNBs, or other base station nodes. Network 500 may include an HeNB gateway 534 for scalability reasons. The macro-eNB 502 and the gateway 534 may each communicate with a pool 540 of one or more Mobility Management Entities (MME) 542 and/or a pool 544 of one or more Serving Gateways (SGW) 546.

The eNB gateway 534 may appear as a C-plane and a U-plane relay for dedicated S1 connections 536. An S1 connection 536 may be a logical interface specified as the boundary between an evolved packet core (EPC) and an Evolved Universal Terrestrial Access Network (EUTRAN). As such, the S1 connection provides an interface to Core Network (CN) components, such as the MME and SGW, which may be further coupled to other components and/or networks (not shown). The eNB gateway 534 may act as a macro-eNB 502 from an EPC point of view. The C-plane interface may be S1-MME and the U-plane interface may be S1-U. Network 500 may include a macro-eNB 502 and multiple additional eNBs, which may be picocell or femtocell eNBs 510.

The eNB gateway 534 may act towards an eNB 510 as a single EPC node. The eNB gateway 534 may ensure S1-flex connectivity for an eNB 510. The eNB gateway 534 may provide a 1:n relay functionality such that a single eNB 510 may communicate with n MMEs 542. The eNB gateway 534 registers towards the pool 540 of MMEs 542 when put into operation via the S1 setup procedure. The eNB gateway 534 may support setup of S1 interfaces 536 with the eNBs 510.

Network 500 may also include a self organizing network (SON) server 538. The SON server 538 may provide automated optimization of a 3GPP LTE network. The SON server 538 may be a key driver for improving operation administration and maintenance (OAM) functions in the wireless communication system 500. An X2 link 520 may exist between the macro-eNB 502 and the eNB gateway 534. X2 links 520 may also exist between each of the eNBs 510 connected to a common eNB gateway 534. The X2 links 520 may be set up based on input from the SON server 538. If an X2 link 520 cannot be established, the S1 link 536 may be used to convey information, such as between different cells or networks.

Backhaul signaling may be used in network 500 to manage various functionality as described further herein, such as between eNBs and other network nodes, and/or other networks. For example, these connections may be used as further described successively herein to facilitate multimode operation, such as with other network types, such as GERAN or UTRAN networks. UEs 512 may be coupled to the various eNBs, and may also move between cells associated with the eNBs, as well as communicate with cells of other network types (not shown).

For example, an operator's system may include multiple networks, which may be of multiple types (for example, in addition to the LTE network configurations shown in FIGS. 3 and 4). For example, one type may be an LTE system, which is data-centric. Another type may be a UTRAN system, such as a W-CDMA system. Yet another type may be a GERAN system, which may in some cases be Dual Transfer Mode (DTM) capable (also denoted herein as a DTM GERAN). Some GERAN networks may be non-DTM capable. Multi-mode user terminals, such as UEs, may be configured to operate in multiple networks, such as these, as well as other (e.g., WiFi or WiMax networks, etc.).

DTM, as specified in, for example, 3GPP TS 43.055, is a protocol based on the GSM standard that allows simultaneous transfer of CS (voice) and PS (data) over the same radio channel. A mobile phone (e.g., a user terminal or UE) that is DTM capable can be engaged in both CS and PS call and simultaneous voice and packet data connection in DTM GERAN networks.

In some LTE implementations, devices may support functionality known as Idle-Mode Signaling Reduction (ISR). ISR is a mechanism that allows a user terminal, such as a UE, to remain simultaneously registered in a UTRAN or GERAN Routing Area (RA) and an E-UTRA Tracking Area list. This can allow a UE to make cell reselections between LTE and UTRAN/GERAN networks without a need to send a Tracing Area Update (TAU) or Routing Area Update (RAU) request, as long as the UE remains within the registered RA and TA list. As such, ISR can be used to reduce the mobility signaling and may improve the battery life of UEs. This may be particularly important in initial deployments of LTE systems where coverage may be limited and inter-RAT changes may be frequent. Moreover, this may also be important until the availability of PS-based voice implementations, such as Voice Over IP (VOIP) are deployed, as operators may frequently switch operation between LTE and GERAN or UTRAN networks to support CS voice calling. To support ISR, the Home Subscriber Server (HSS) needs to maintain two PS registrations (one from the Mobility Management Entity (MME) and another from the Serving GPRS Support Node (SGSN)). In addition, ISR requires more complex paging procedures. In an exemplary embodiment, a status of ISR may be either On or Off, indicating whether ISR is in use or not.

The MME is an important control-node for the LTE access-network. The MME is responsible for idle mode UE tracking and paging procedures, including retransmissions. The MME is also involved in the bearer activation/deactivation process and is responsible for choosing the Serving Gateway (SGW) for a UE at the initial attach, and at the time of intra-LTE handover involving Core Network (CN) node relocation.

The MME is also responsible for authenticating the user (by interacting with the HSS). The Non-Access Stratum (NAS) signaling terminates at the MME, which is also responsible for generation and allocation of temporary identities to UEs. For example, the MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME.

Another important function of the MME is to provide the control plane function for mobility between LTE and 2G/3G access networks, such as UTRAN and GERAN networks, with the S3 interface terminating at the MME from the SGSN. The MME also terminates the S6a interface towards the home HSS for roaming UEs.

The Serving Gateway (SGW) routes and forwards user data packets, while also acting as the mobility anchor for the user plane during inter-eNodeB handovers and as the anchor for mobility between LTE and other 3GPP technologies (e.g., terminating S4 interface and relaying the traffic between 2G/3G systems and the Packet Gateway (PGW)). For idle state UEs, the SGW terminates the DL data path and triggers paging when DL data arrives for the UE. The SGW manages and stores UE contexts, e.g. parameters of the IP bearer service, network internal routing information, etc. The SGW may also perform replication of the user traffic in case of lawful interception.

The PDN Gateway provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful Interception and packet screening.

Packet Switched (PS) Escalation Implementations

Figure 6:
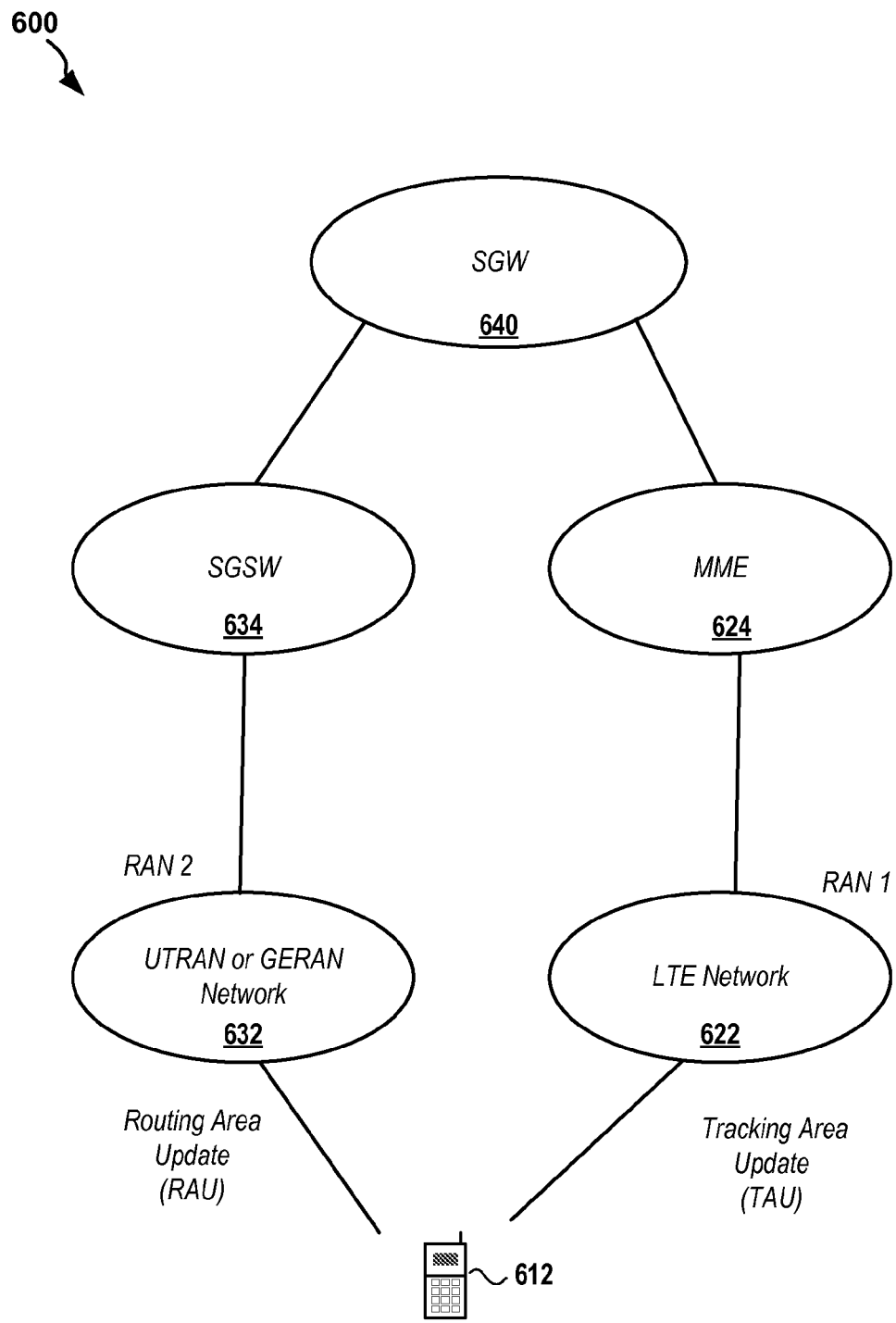
FIG. 6 illustrates an example configuration of network nodes configured in a multimode communication system.

FIG. 6 illustrates an example configuration 600 of network nodes for multimode operation between an LTE network and other networks, such as UTRAN or GERAN networks, which may be used to provide functionality as described herein. A multimode UE 612 may be connected to an LTE network 622, such as to an eNB such as eNB 615 of FIG. 4, and may move between the LTE Network and a UTRAN or GERAN network 632, which may be served by a base station, such as a Node B (NB). The LTE network may include an MME 624, such as shown previously in FIG. 5, as well as an SGW 640, such as shown in FIG. 5.

The SGW may be connected to a PGW (now shown), and the MME may be connected to a legacy Mobile Switching Center (MSC) via an SGs interface. The SGs interface provides connectivity between an LTE network and a legacy 2G or 3G network, such as GERAN or UTRAN.

When the UE 612 moves between networks, it may perform a Tracking Area Update (TAU) procedure when moving to the LTE network, or a Routing Area Update (RAU) procedure when moving to a UTRAN or GERAN network. The RAU or TAU may be initiated when the UE 612 detects a new tracking or routing area. An example of this is illustrated in 3GPP TS 23.401, and example call flows are illustrated in Annex B of TS 23.401, both of which are incorporate herein by reference.

A user terminal or UE may be within the coverage area of several networks of different types. These may be controlled or operated by a common carrier or operator, and devices within the various networks may be configured to interoperate across different network types as described subsequently herein.

Figure 7:
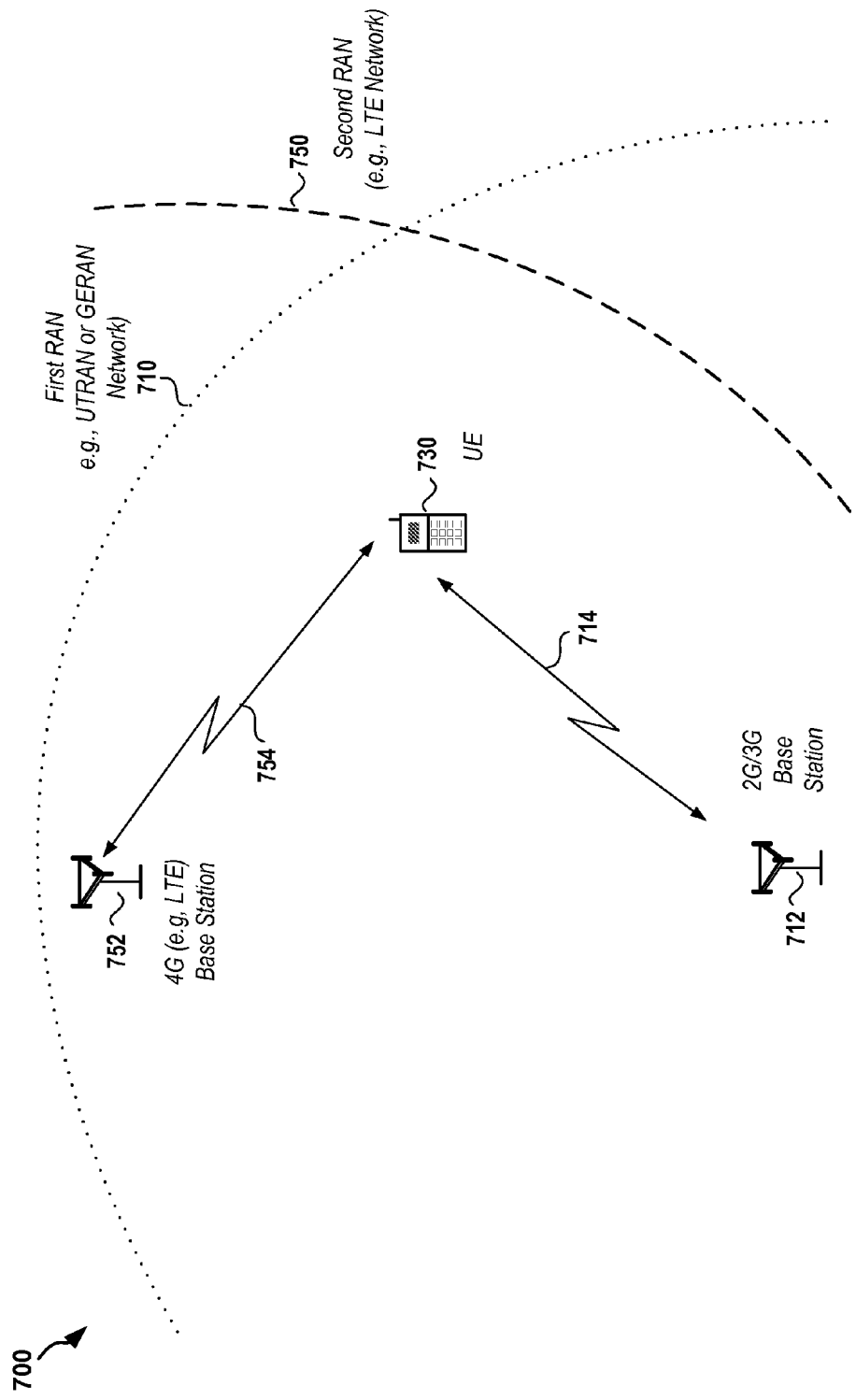
FIG. 7 illustrates details of an example embodiment of a multimode communication system including 2G/3G cells and a 4G cell.

An example of this is illustrated in FIG. 7, which shows an example network 700 where a user terminal 730, such as a multi-mode UE 730, is within coverage range of a first wireless network cell 710 of a first Radio Access Technology (RAT) as well as a second wireless network 750 of a second RAT. In this example shown, the second wireless network is a 4G LTE network and the first wireless network is a 2G/3G GERAN or UTRAN network. Corresponding base stations 712, serving the first wireless network and 752 serving the second wireless network are within range of the UE 730. In operation, it may be desirable to move the UE 730 between the first wireless network and the second wireless network, such as to facilitate mobility or for other reasons, such as to control operation based on user/device and/or network operator preferences. For example, as described previously with respect to FIGS. 1-3, user terminals or UEs may be configured in a Voice Preference or user terminal usage mode that may be one of "Voice Centric" and "Data Centric." Likewise, carriers may specify a preference for a UE when on the network, such as via Cell Priority Information, which may be sent from the network and base station in one or more Information Elements (IEs).

Figure 8:
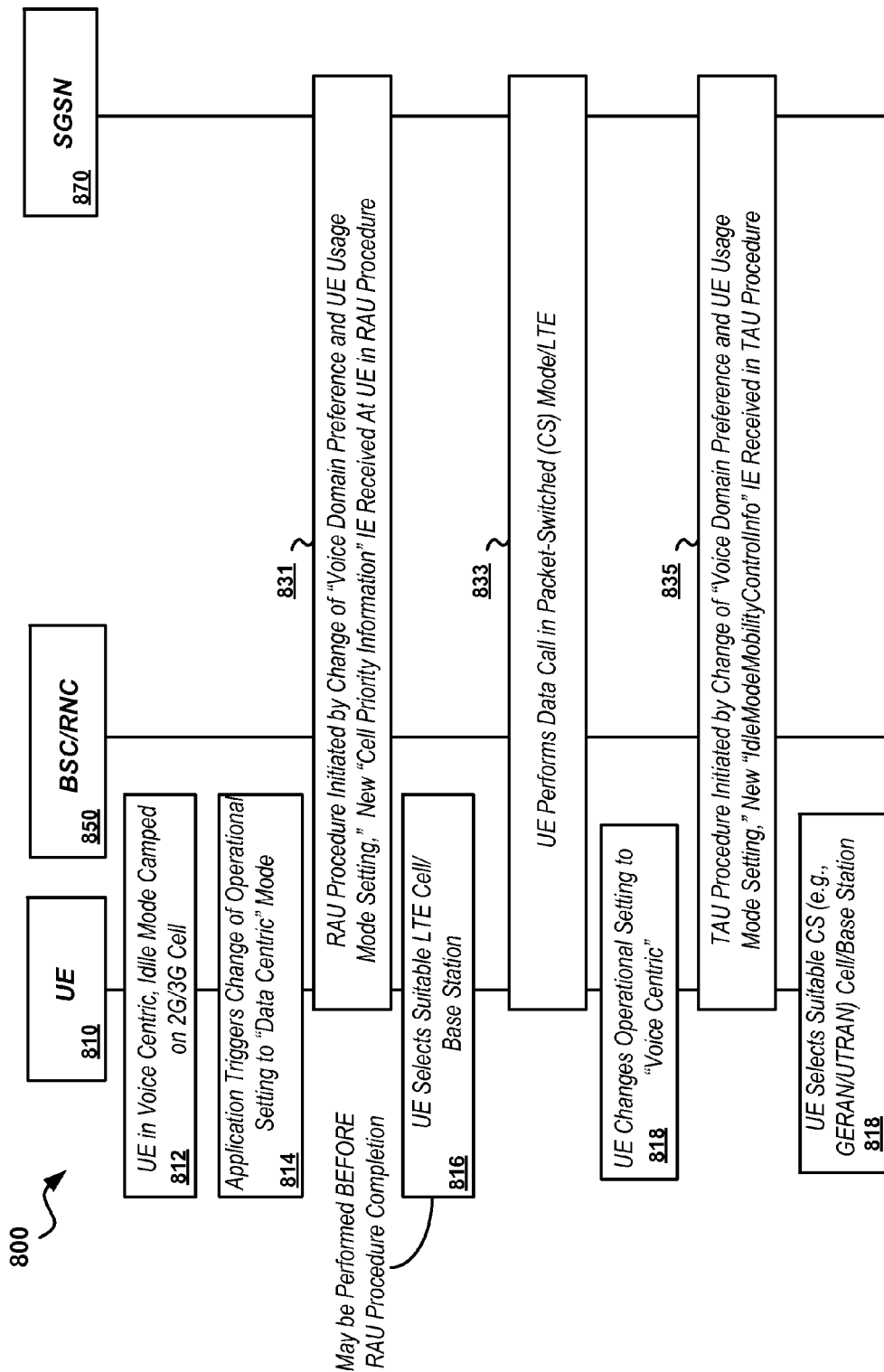
FIG. 8 illustrates details of an embodiment of an example connection flow wherein an application triggers a change of UE operational mode and Packet Switched (PS) escalation.

Attention is now directed to FIG. 8, which illustrates an example of a process flow 800 among a user terminal or UE 810 in an Idle Mode camping on a 2G/3G cell at stage 812, such as described previously with respect to FIG. 1B. UE 810 may be served by a base station node, such as a Base Station Controller (BSC) or Radio Network Controller (RNC) 850 depending on the type of 2G/3G network. The BSC/RNC 850 may be further coupled to a Serving GPRS Support Node (SGSN) 870, which is responsible for delivery of data to/from served mobile stations, routing and transfer, mobility management, logical link management, authentication and charging functions, as well as other functions.

UE 810 may be configured in a "Voice Centric" (VC) user terminal usage mode, which may set at the device by, for example, a user or pre-programmed during manufacture or at the time of carrier activation In general, the usage mode is a parameter set on the device by the user or pre-programmed based on the type of device. For example, handset user terminal devices, such as mobile phones, may be configured to be in a Voice Centric mode, giving preference to voice-oriented calls and associated supporting networks, whereas other user terminal devices, such as notebook computer dongles, etc., may be configured in a "Data Centric" (DC) mode, giving preference to data-oriented calls/communications and associated networks. The device mode is assumed to be a device specific parameter set by a user or default value programmed in the device and not configured by the network or by applications running on the device.

At stage 814, a trigger event may occur to initiate change of configuration at the UE to a Data Centric mode from a Voice Centric mode. This event may be, for example, a trigger generated from an application executing on the UE based on a requirement such as a Quality of Service (QoS) requirement. For example, the application may require high data throughput, which is only supported on a 4G network or is preferably performed over a 4G network such as an LTE network. To support this trigger, the UE may be configured so that an application may be allowed to change the UEs usage mode from Voice Centric to Data Centric (or vice-versa). For example, as part of the application trigger, the application may change the UEs device mode setting from Voice Centric to Data Centric (and subsequently back upon completion of the data call, as described subsequently below).

A Routing Area Update (RAU) procedure may be initiated by the UE in response to the change in operating preference (e.g., from Voice Domain Preference to Data Preference) and associated UE device mode setting at stage 831. For example, the change of configuration setting may trigger the RAU procedure in accordance with 3GPP TS 23.060 (Release 9).

If selective Idle Mode camping is applied, the UE should receive new Cell Selection Priorities (also denoted as Cell Priority) from the 2G/3G network, giving higher priority to E-UTRAN. For example, UE 810 may then receive, as part of the procedure, new Dedicated Priority Information IE (Information Element), corresponding to network-provided Cell Priority information. For example, the Cell Priority may be changed so that the highest priority network types supported by the device changes from 2G/3G to 4G and/or between available 2G/3G networks.

In some embodiments, the UE may begin the process of selecting an LTE cell and associated base station at stage 816 before completion of the RAU procedure of stage 631. For example, the LTE selection process may be done as part of the application trigger at stage 814 (i.e., simultaneous with initiating the RAU at stage 831) or may be done before completion of the RAU procedure and delivery of the new Dedicated Priority Information from the network in stage 831. As shown in FIG. 8, stage 816 may be performed simultaneously with stage 831 or before completion of stage 831, and the received Cell Priority Information from the SGSN 870 may be disregarded in selecting the LTE network.

Once the UE selects a suitable LTE cell and base station, such as an eNB, the UE 810 may then perform a data call in stage 833 in Packet Switched (PS) mode, such as using standard LTE signaling and data transfer. Upon completion of the data call, the UE may then reconfigured it's usage mode back to Voice Centric mode from Data Centric mode at stage 818. This may be done automatically at the UE upon completion of the data connection and/or by completion or closure of execution of the triggering application.

At stage 835, a Tracking Area Update (TAU) procedure may be initiated. This may be in response to the change of Operational Setting in the UE back to Voice Centric. If selective Idle Mode camping is applied, the UE 810 should receive new Cell Selection priorities from the network giving higher priority to 2G/3G (e.g., GERAN/UTRAN). For example, as part of stage 835, the network may provide a new IdleMode-MobilityControlInfo IE to the UE. Based on this information, the UE may then select a suitable Circuit Switched (CS) cell and associated base station at stage 818. For example, the UE may return to the previous 2G/3G cell camped on at stage 812 or may select a new 2G/3G cell. This may be done as part of a standard cell selection procedure.

Figure 9:
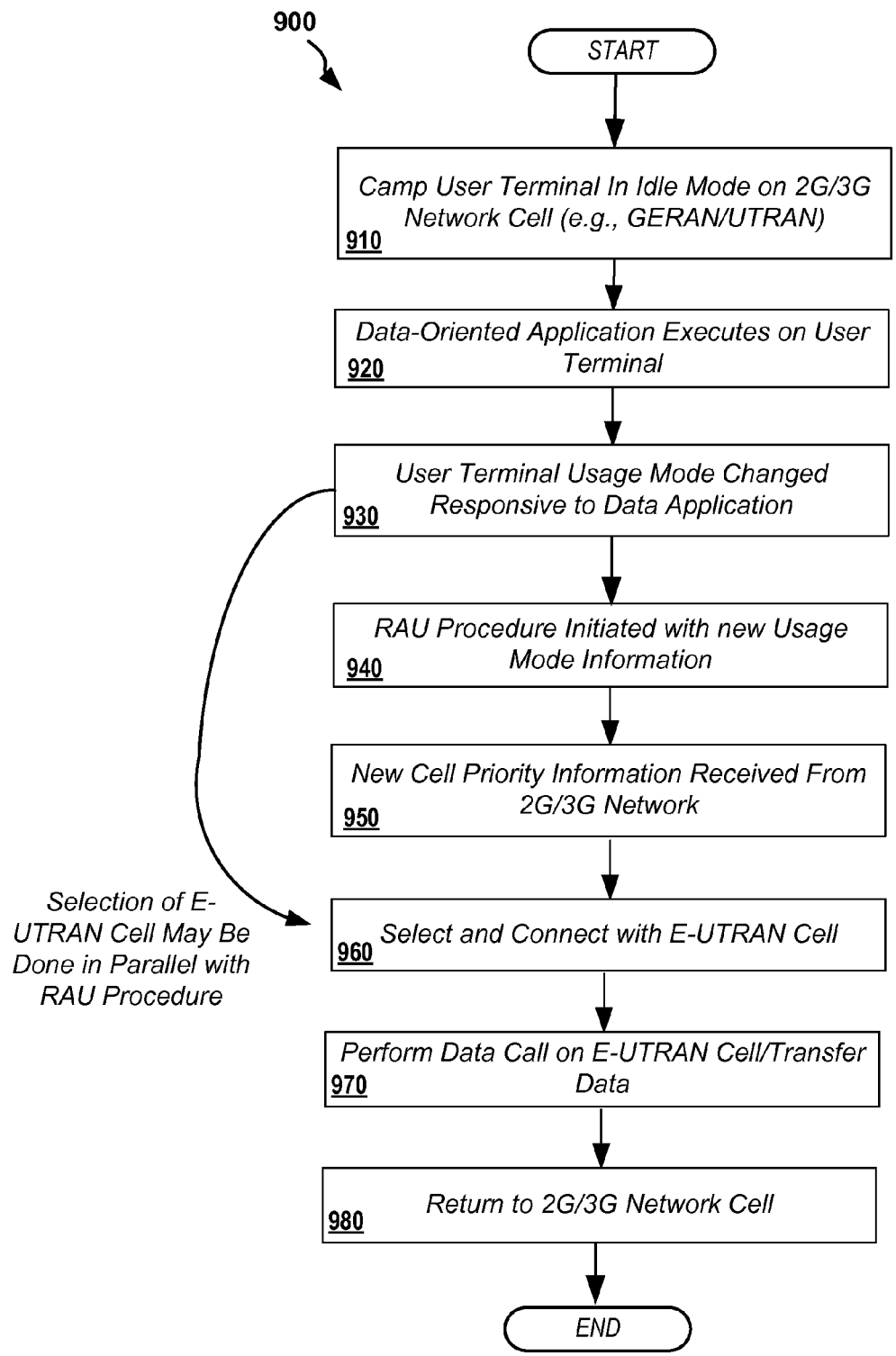
FIG. 9 illustrates details of an embodiment of a process consistent with the workflow of FIG. 8 for performing PS escalation in a user terminal.

FIG. 9 illustrates details of an embodiment of a process 900, which may be implemented by a user terminal such as UE 810 of FIG. 8. At stage 910, a user terminal operating in an Idle mode on a first wireless network cell, such as a 2G or 3G network cell, may be camped on the first wireless network cell. The first wireless network may be a GERAN or UTRAN network. At stage 920, a data-oriented application may be executed on the user terminal. The data-oriented application may be an application requiring a high QoS, such as a high data rate video or other connection. At stage 930, a user terminal usage mode may be changed based at least in part on the on the application executing on the user terminal. For example, the usage mode may change from a Voice Centric mode to a Data Centric mode. At stage 940, a Routing Area Update (RAU) procedure may be initiated. The RAU procedure may include providing information associated with the usage mode change from the user terminal and receiving new Cell Priority Information from the wireless network at stage 950.

The process 900 may further include selecting an E-UTRAN cell at stage 960. Stage 960 may be performed in parallel with or before stage 940 and/or stage 950 in some implementations. St stage 960, an E-UTRAN cell, such as an LTE cell, may be selected by the UE and a connection with the E-UTRAN cell may be established. The E-UTRAN cell may be an LTE cell served by an eNB. At stage 970, a data call may be performed between the UE and the eNB in a Packet Switched (PS) format. Subsequent to completing the data communication between the UE and eNB, the UE may return to a 2G or 3G network cell at stage 980, which may be the same cell as the UE was originally camped on or may be a different cell.

The stage 960 of selecting an E-UTRAN cell may, for example, be initiated before receipt of the new Cell Priority Information. Alternately, or in addition, the stage of selecting an E-UTRAN cell may be initiated responsive to the change in usage mode on the user terminal. The usage mode may be changed by the application, such as changing a configuration parameter on the UE from the application.

The process 900 may further include initiating, from the user terminal, a Tracking Area Update (TAU) procedure after completing the data communication in stage 970. The 2G/3G wireless network cell may be selected responsive to new information received in the TAU procedure. The second wireless network cell may be a GERAN or UTRAN cell. The method may further include camping the user terminal on the second wireless network cell.

Process 900 may be embodied in a tangible medium. For example, process 900 may be embodied as a computer program product including a computer-readable medium having codes for causing a computer to perform one or more of the stages as shown in FIG. 8 and/or 9.

Process 900 may be embodied in a communication system or communications apparatus, such as a user terminal or UE, configured to perform one or more of the stages as shown in FIG. 8 and/or 9.

Alternately, or in addition, the communication system or communications apparatus may include one or more means for performing one or more of the stages as shown in FIG. 8 and/or 9 in a device such as a user terminal or UE.

Figure 10:
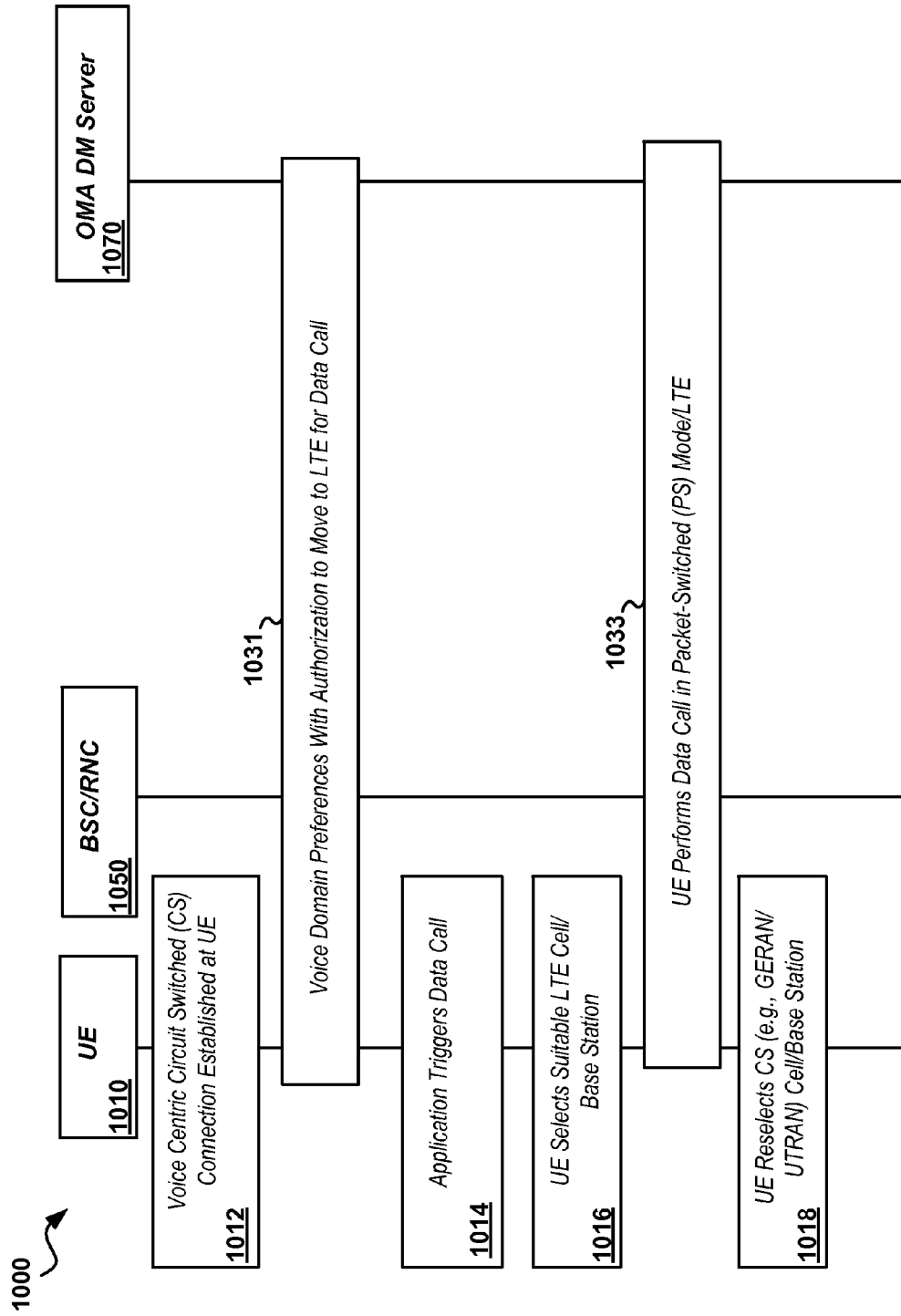
FIG. 10 illustrates details of an embodiment of an example connection workflow wherein the network provided cell selection priority information and authorization to perform PS escalation based on a predefined class of calls.

Attention is now directed to FIG. 10, which illustrates an example of a process flow 1000 among a user terminal or UE 1010 in an Idle Mode camping on a 2G/3G cell at stage 1012, such as described previously with respect to FIG. 1B. Process flow 1000 is similar to process flow 800 as shown in FIG. 8, however, in process flow 1000 UE 1010 is authorized to reselect another cell, such as a 4G/LTE cell, without changing configurations settings (e.g., user terminal usage mode). In general, it may be undesirable for a user terminal to autonomously decide to reselect cells (when camped on 2G/3G cells) by disregarding cell reselection priorities provided by the network (absent network control). Therefore, as described below with respect to FIG. 10, the UE may be provided with a limited authorization to reselect a cell based on a particular type or class of calls, such as calls requiring a high data rate connection.

To implement this approach, as shown in FIG. 10, UE 1010 may be served by a base station node, such as a Base Station Controller (BSC) or Radio Network Controller (RNC) 1050 depending on the type of 2G/3G network. The BSC/RNC

1050 may be further coupled to an OMA DM Server Node 1070. At stage 1012, UE 1010 may be camped on a 2G/3G cell, such as shown in FIG. 1B. At stage 1031, the "Voice Centric" UE 1010 may receive authorization to reselect a new cell (e.g., a 4G/LTE cell) for certain types of applications and associated data requirements). This may be signaled from OMA DM Server 1070 at stage 1031. The decision to reselect a 4G/LTE cell may be based on the authorization as well as the UE's configuration settings (e.g., internal usage mode settings). At stage 1014, an application triggers a data call and, if the data call is within the authorized class, the UE may then select a suitable 4G/LTE cell and connect to the associated base station/eNB at stage 1016. In doing this, the UE 1010 may disregard the cell reselection priorities (e.g., Cell Priority information) provided from the network to select the 4G/LTE cell. At stage 1033 the UE 1010 may then perform a data call on the selected Packet Switched 4G/LTE network and associated eNB. At stage 1018, the UE may then reselect a 2G/3G cell, which may be the original 2G/3G cell the UE 1010 was camped on at stage 1012 or another cell.

Figure 11:
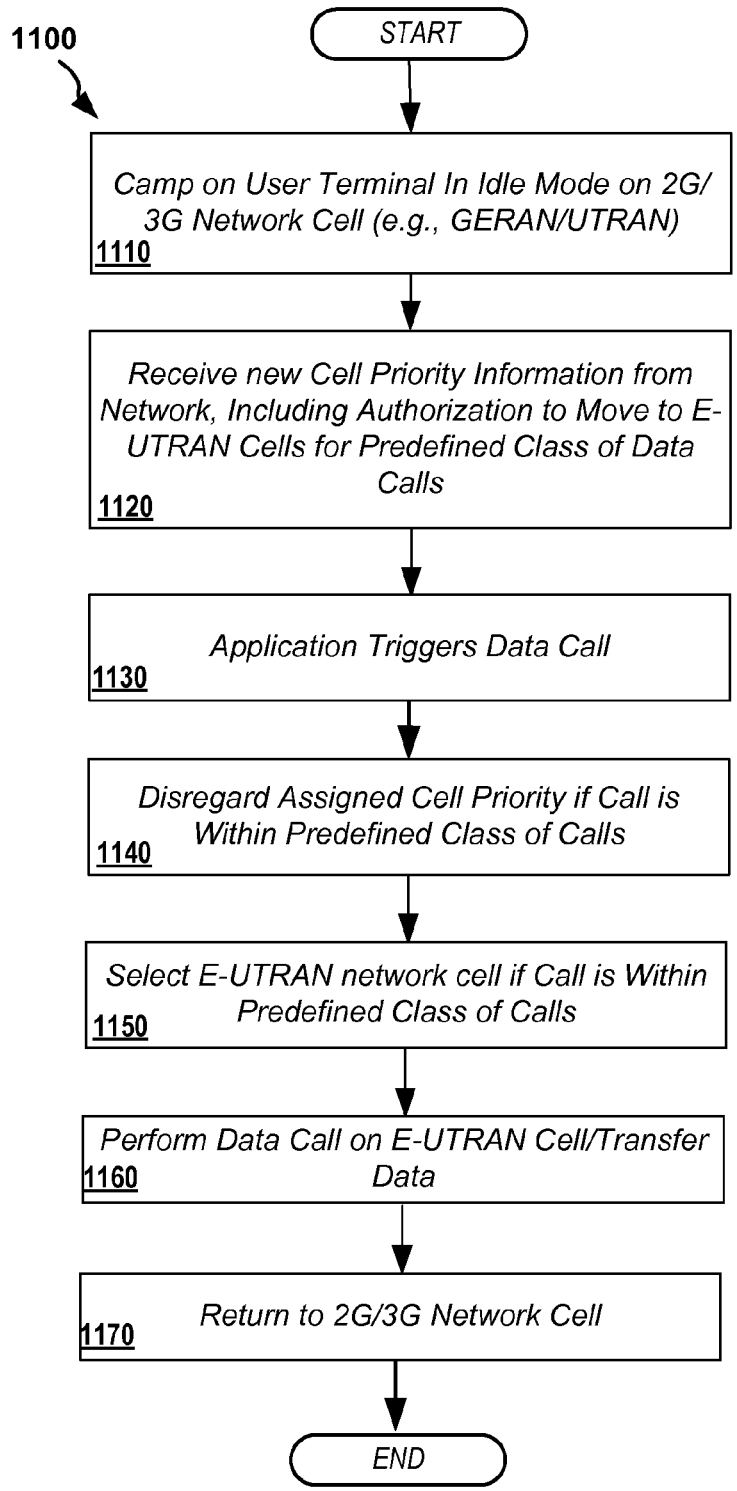
FIG. 11 illustrates details of an embodiment of a process consistent with the workflow of FIG. 10 for performing PS escalation in a user terminal.

Policies defining appropriate classes of calls for authorized PS escalation may be defined by the operator. For example, these may be based on a required QoS and/or data throughput or other requirement. One example policy criteria is listed below:

GBR>64 kpbs service shall be in LTE
GBR<64 kpbs service shall be in 2G/3G
MBR/AMBR>16 Mbps service shall be in LTE
MBR/AMBR>2 Mbps service shall be in LTE
MBR/AMBR<2 Mbps service shall be in 2G/3G FIG. 11 illustrates details of an embodiment of a process 1100, which may be implemented by a user terminal such as UE 1010 of FIG. 10 consistent with process flow 1000 shown in FIG. 10. At stage 1110, user terminal in an Idle mode may be camped on a first wireless network cell, such as a GERAN or UTRAN cell. At stage 1120, new Cell Priority information, which may be assigned by the network, may be received at the user terminal. The new Cell Priority information may include a cell selection priority, and may further include authorization from the user terminal to move to an E-UTRAN cell for a predefined class of calls. The movement to the E-UTRAN cell may be initiated or in response to an application executing on the user terminal that requires a high QoS, such as a high data rate. At stage 1130, the application may trigger a data call or connection, which may require a data rate within the predefined class of calls (e.g., a data rate above a predefined threshold). The Cell Priority information may include a defined cell selection priority, such as restriction cell selection to a 2G or 3G network when the UE is capable of a 4G connection and a 4G network, such as an LTE network is available.

At stage 1140, the UE may disregard the Cell Priority information, subject to the authorization. By disregarding the defined Cell Priority, the UE may select a E-UTRAN network cell and associate base station/eNB at stage 1150 (if the call requirements are within the predefined class of authorized calls). At stage 1160, the UE may connect to the eNB to make a data call and transfer data between the UE and eNB. Upon completion of the data call, the UE may return, at stage 1170, to a 2G or 3G network, which may be the original network or a newly selected network.

The Cell Priority Information may, for example, define, based on a carrier-preference, a priority or limitation on cell types accessible by the user terminal, such as a limitation to 2G or 3G network cells. The process 1100 may further include receiving a trigger from an application executing on the user terminal to initiate the data call, and disregarding, in response to the trigger, the assigned cell priority consistent with the authorization. For example, the new Call Priority information may authorize escalation of service for the user terminal from a 2G or 3G network to a 4G network, such as an LTE network subject to the predefined call classification.

The first wireless network cell may be, for example, a GERAN cell, and the E-UTRAN cell may be an LTE cell served by an eNB. Alternately, the first wireless network cell may be UTRAN cell and the E-UTRAN cell may be an LTE cell. The user terminal may be a multi-mode UE.

The predefined class of data calls may include, for example, data calls requiring bit rates above a predefined threshold. The predefined threshold may be 64 kilobits per second, 2 megabits per second, 16 megabits per second, or another predefined value, which may be based on network, device, and/or application capability or requirements.

Process 1100 may be embodied in a tangible medium. For example, process 1100 may be embodied as a computer program product including a computer-readable medium having codes for causing a computer to perform one or more of the stages as shown in FIG. 10 and/or 11.

Process 1100 may be embodied in a communication system or communications apparatus, such as a user terminal or UE, configured to perform one or more of the stages as shown in FIG. 10 and/or 11.

Alternately, or in addition, the communication system or communications apparatus may include one or more means for performing one or more of the stages as shown in FIG. 10 and/or 11 in a device such as a user terminal or UE.

Figure 12:
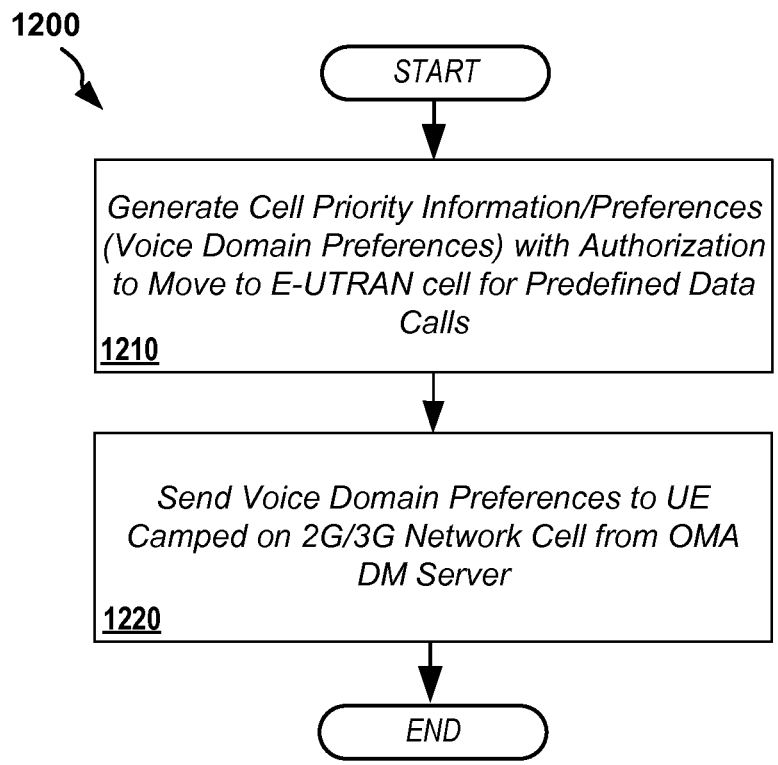
FIG. 12 illustrates details of an embodiment of a process consistent with the workflow of FIG. 10 for performing PS escalation at a base station.

FIG. 12 illustrates details of an embodiment of a process 1200, which may be implemented by a base station or NB, such as BSC or RNC of FIG. 10. Process 1200 may be performed in conjunction with process 1100 as described in FIG. 11. At stage 1210, Cell Priority information for a user terminal such as UE 1010 of FIG. 10 may be received or generated at a base stations, such as base station 1050 of FIG. 10. In addition, data defining an authorization to allow the user terminal to move to a different cell type, such as an LTE cell when the Cell Priority information limits cell types to 2G/3G cells, may be provided. The authorization may be a binary on/off authorization and/or may include information regarding the classification of predefined calls authorized for escalation. At stage 1220, The Cell Priority information may be sent to the user terminal along with the authorization. For example, the user terminal may be camped on a 2G or 3G cell, such as a GERAN or UTRAN cell, and the preferences may limit the user terminal to operation on the 2G or 3G cells. The authorization information may allow the user terminal to move to a 4G cell, such as an LTE cell, when the associated call is within a predefined class of calls, such as high data rate calls.

Process 1200 may be embodied in a tangible medium. For example, process 1200 may be embodied as a computer program product including a computer-readable medium having codes for causing a computer to perform one or more of the stages as shown in FIG. 10, 11 and/or 12.

Process 1200 may be embodied in a communication system or communications apparatus, such as a base station or Node B configured to perform one or more of the stages as shown in FIG. 10, 11 and/or 12.

Alternately, or in addition, the communication system or communications apparatus may include one or more means for performing one or more of the stages as shown in FIG. 10, 11 and/or 12 in a device such as a base station or Node B.

Figure 13:
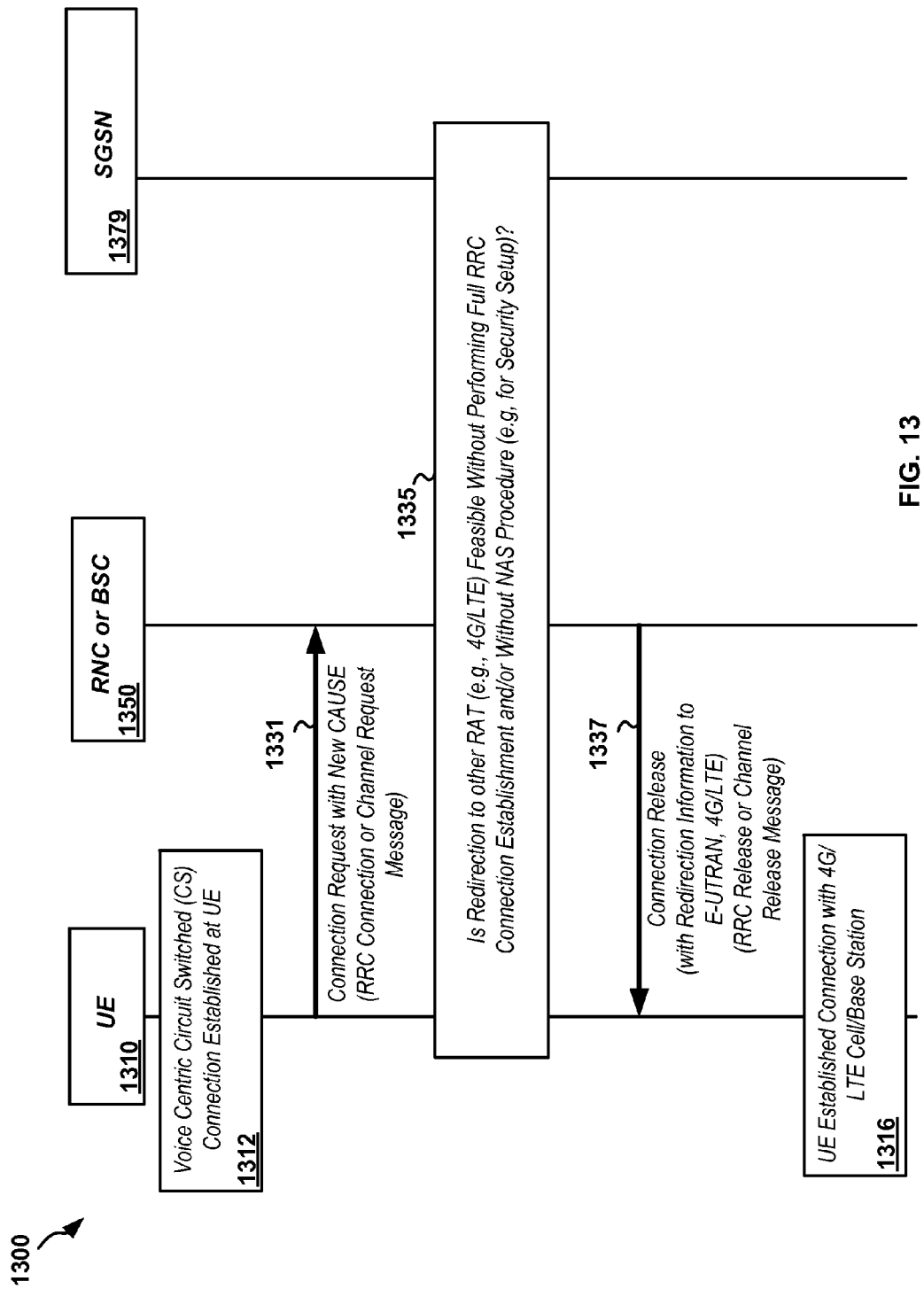
FIG. 13 illustrates details of an embodiment of an example connection workflow wherein the network provided cell selection priority information and authorization to perform PS escalation based on cause information provided to the network from a user terminal.

Attention is now directed to FIG. 13, which illustrates an example of a process flow 1200 among a user terminal or UE 1310 in an Idle Mode camping on a 2G/3G cell at stage 1312, such as described previously with respect to FIG. 1B. Process flow 1300 is similar to process flow 800 as shown in FIG. 8, and process flow 1000 shown in FIG. 10, however, in process flow 1300 Radio Resource Control (RRC) protocols of the 2G/3G RAT are used, with signaling at the NAS level avoided.

At stage 1331, UE 1310, triggered by an executing application, may send an RRC Connection Request message (for UTRAN) or Channel Request Message (on GERAN). The message includes a CAUSE Indicator defining the call requirements, such as a for a "Data Call with Special QoS Parameters" (e.g., required high data rate/throughput). Typically, the CAUSE Indicator should only be used after the UE 1310 has found a suitable 4G/LTE cell.

The RAN Entity (e.g., RNC or BSC 1350) may then make an immediate decision at stage 1335 to redirect the UE 1310 to the identified 4G/LTE network, without involving core entities or associated functions. This may be advantageous in avoiding problems where a UE may want to setup a connection with a GERAN/UTRAN network and should not mistakenly be redirected to an LTE network. At stage 1337, the RAN 1350 may send a corresponding RRC Release message (UTRAN) or Channel Release (GERAN) message to UE 1310, including appropriate redirection information to the 4G/LTE network cell and associated base station. At stage 1316, the UE may then establish a connection with the LTE base station and perform the desired data call.

Figure 14:
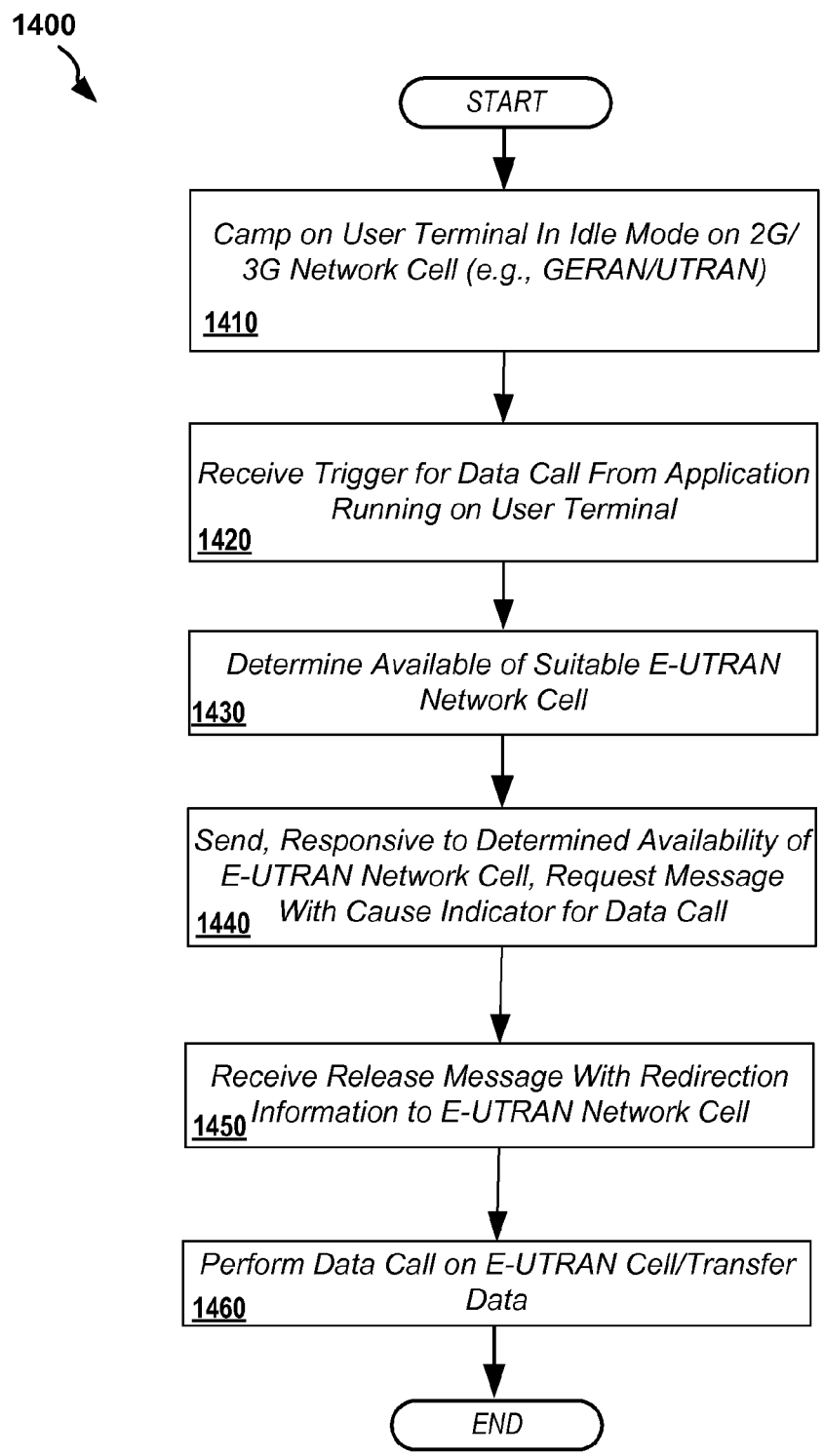
FIG. 14 illustrates details of an embodiment of a process consistent with the workflow of FIG. 13 for performing PS escalation at a user terminal.

FIG. 14 illustrates details of an embodiment of a process 1400, which may be implemented by a user terminal or UE, such as UE 1310 of FIG. 13. Process 1400 may be performed in conjunction with process 1300 as described in FIG. 13. At stage 1410, a user terminal may be camped in an Idle mode in a first wireless network cell. The first wireless network may be a GERAN or UTRAN network cell. At stage 1420, a trigger may be received from an application executing on the user terminal. The trigger may be a trigger for a data call having a particular QoS requirement. At stage 1430, a suitable E-UTRAN network cell, such as a 4G/LTE cell, may be identified. At stage 1440, subsequent to identification of the E-UTRAN cell, a request message may be sent to the first wireless network, with the message including a Cause indicator for a data call. The Cause indicator may be associated with a particular required QoS and/or data rate, such as described previously with respect to FIG. 13. At stage 1450, a release message with redirection information to the E-UTRAN network cell and associate base station/eNB. At stage 1460, a data call may and data communications may be performed between the UE and the eNB.

The first wireless network cell may, for example, be a GERAN cell and the E-UTRAN cell may be an LTE cell. The request message may be a GERAN Channel Request message and the release message may be a GERAN Channel Release message. Alternately, the first wireless network cell may be a UTRAN cell and the E-UTRAN cell may be an LTE cell. The request message may be a UTRAN RRC Connection Request message and the release message may be a UTRAN RRC Release message. The user terminal may be a multimode UE.

The Cause indicator may, for example, include information defining a requirement for a data call with specific Quality of Service (QoS) parameters or requirements. The QoS parameters or requirements may relate to a minimum required data rate.

The process 1400 may further include, for example, redirecting the user terminal to the E-UTRAN network cell, and performing data communications associated with the application on the selected E-UTRAN cell. The user terminal may be redirected to the E-UTRAN network cell without performing a full RRC Connection Establishment procedure. The user terminal may be redirected to the E-UTRAN network cell without performing a Non-Access Stratum (NAS) procedure for security setup.

Process 1400 may be embodied in a tangible medium. For example, process 1200 may be embodied as a computer program product including a computer-readable medium having codes for causing a computer to perform one or more of the stages as shown in FIG. 13 and/or 14.

Process 1400 may be embodied in a communication system or communications apparatus, such as a base station or Node B configured to perform one or more of the stages as shown in FIG. 13 and/or 14.

Alternately, or in addition, the communication system or communications apparatus may include one or more means for performing one or more of the stages as shown in FIG. 13 and/or 14 in a device such as a user terminal or UE.

Figure 15:
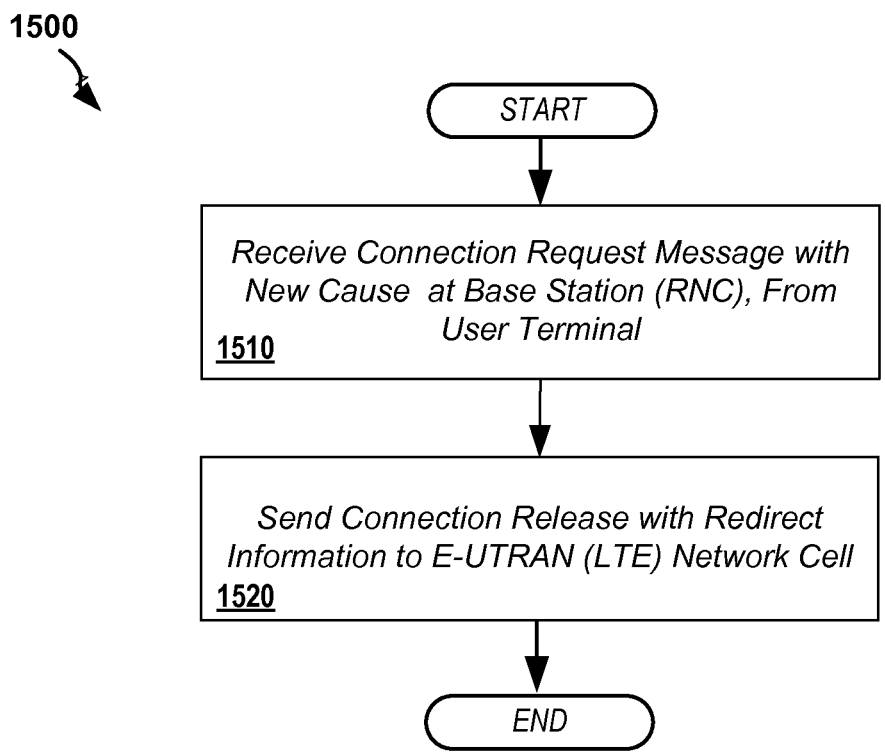
FIG. 15 illustrates details of an embodiment of a process consistent with the workflow of FIG. 13 for performing PS escalation at a base station.

FIG. 15 illustrates details of an embodiment of a process 1500, which may be implemented by a base station or Node B, such as BSC/RNC 1350 shown in FIG. 13. Process 1500 may be performed in conjunction with process 1400 as described in FIG. 14 consistent with process flow 1300 of FIG. 13. At stage 1510, a connection message may be received, with the connection message including a new Cause provided from a user terminal, such as UE 1310 of FIG. 13. At stage 1520, connection release information may be sent from the base station. The connection release information may include redirection information to redirect the UE to a 4G/LTE network identified by the user terminal.

Process 1500 may be embodied in a tangible medium. For example, process 1500 may be embodied as a computer program product including a computer-readable medium having codes for causing a computer to perform one or more of the stages as shown in FIG. 13, 14 and/or 15.

Process 1500 may be embodied in a communication system or communications apparatus, such as a base station or Node B configured to perform one or more of the stages as shown in FIG. 13, 15 and/or 16.

Alternately, or in addition, the communication system or communications apparatus may include one or more means for performing one or more of the stages as shown in FIG. 13, 14 and/or 15 in a device such as a base station or Node B.

In some implementations, a Non-access stratum (NAS)-based implementation may be used to provide PS Escalation. These implementations require signaling on an NAS level, and may be analogous to CS Fallback solutions described previously herein. Examples of analogous procedures for various calling scenarios are illustrated in FIG. 1B. In particular, a user terminal or UE camped on or connected to a 2G or 3G network at stages 112B, 114B, 152B, or 154B may move to a 4G networks such as an LTE network as shown FIG. 1B. For example, for an Idle Mode UE at stage 152B, paging may be used, whereas, for an active mode UE at stage 154B, the SGSN may trigger PDP Context Activation (as further described subsequently herein). At stage 170B, the UE may send a Service Request in Iu mode, with PS escalation completed at stages 182B, 184B, or 186B, depending on network type. In general, these can be classified as three types of solutions: 1) RRC/Channel Release in GERAN/UTRAN with redirection to E-UTRAN; 2) PS Handover from GERAN/UTRAN to E-UTRAN; 3) Inter-RAT Cell Change Order (CCO) from GERAN to E-UTRAN (not applicable to UTRAN).

Figure 16:
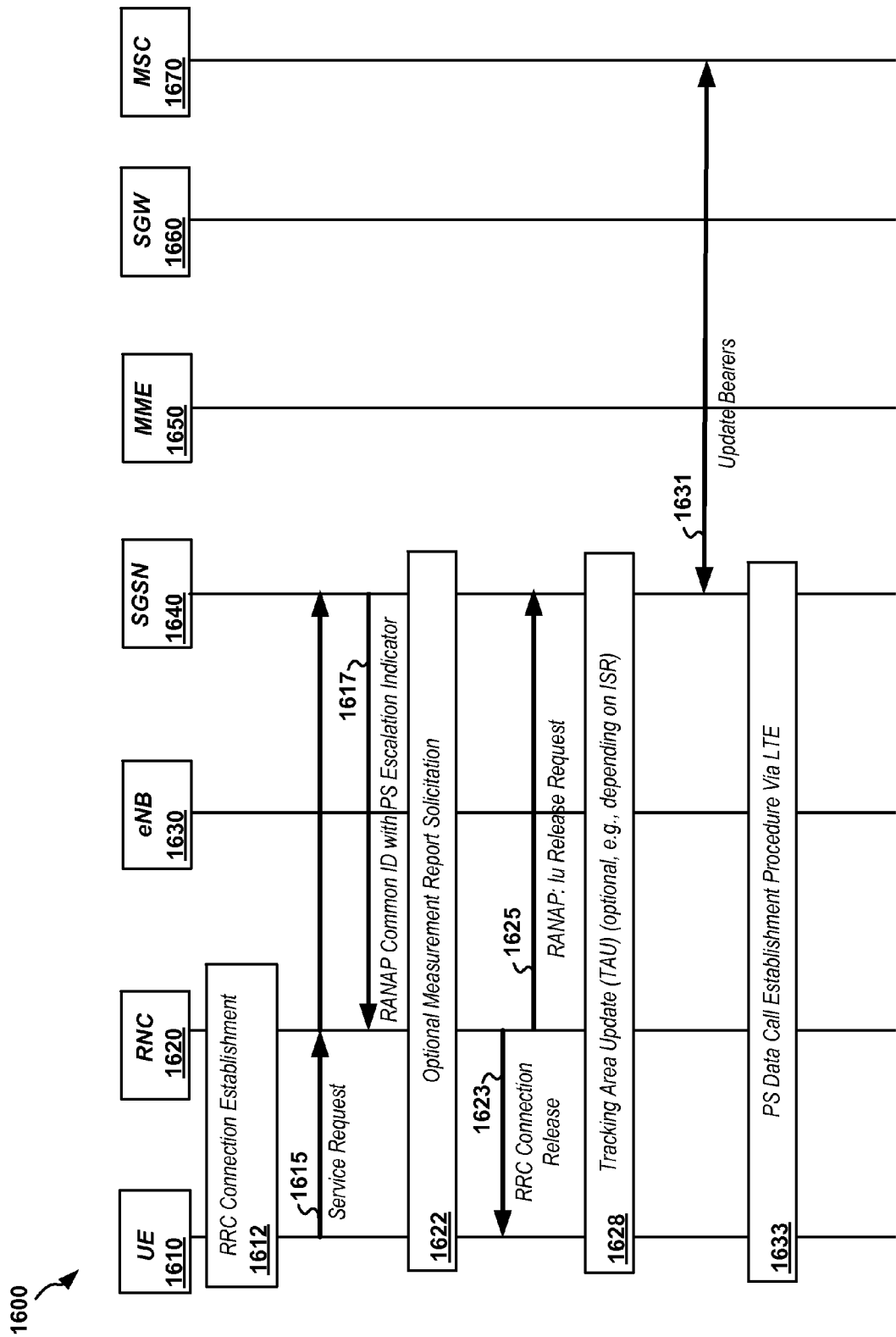
FIG. 16 illustrates details of an embodiment of an example connection workflow using RRC Release-Based PS escalation.

Attention is now directed to FIG. 16, which illustrates an example of a process flow 1600 among a user terminal or UE 1610 in an Idle Mode camping on a 2G/3G cell such as described previously with respect to FIG. 1B. At stage 1612, the UE 1610 may initiate Radio Resource Control (RRC) connection establishment. In a similar case, if the UE is in an active stage, this step need not be performed. At stage 1615, the UE 1610 may send a Non-Access Stratum (NAS) Service Request message to a Serving GPRS Support Node (SGSN) 1640 (which may be an S4-SGSN). SGSN 1640 may then initiate redirection of UE 1610 to an E-UTRAN network and send, at stage 1617, a Radio Access Network Application Part (RANAP) message with a PS Escalation Indicator. An existing Common ID message may be used and extended for this part (e.g., corresponding to an initial Context Setup Request or UE Context Modification Request as described in 3GPP TS 36.413). As stage 1622, the network may optionally request a measurement report from the UE, with LTE channels then being measured at the UE and report information provided. RNC 1620 may then send an RRC Connection Release message at stage 1623 (instead of accepting the connection), which may include redirection information (to a target E-UTRAN cell). In addition, the RNC 1620 may send an Iu Release Request message to SGSN 1640 at stage 1625 (e.g., informing the SGSN the UE has left). The signaling connection may then be released to both the UE 1610 and SGNS 1640 locally. If Inter-System Signaling Reduction (ISR) is not active, a TAU Procedure should then be performed at stage 1628, and any existing bearers between SGSN 1640 and Serving Gateway (SGW) 1660 may then be released. At stage 1633, the UE may establish a PS connection with the E-UTRAN network cell and base station, which may be an LTE eNB such as eNB 1630. Data may then be transferred between UE 1610 and eNB 1630 in a packet switched mode.

Figure 17:
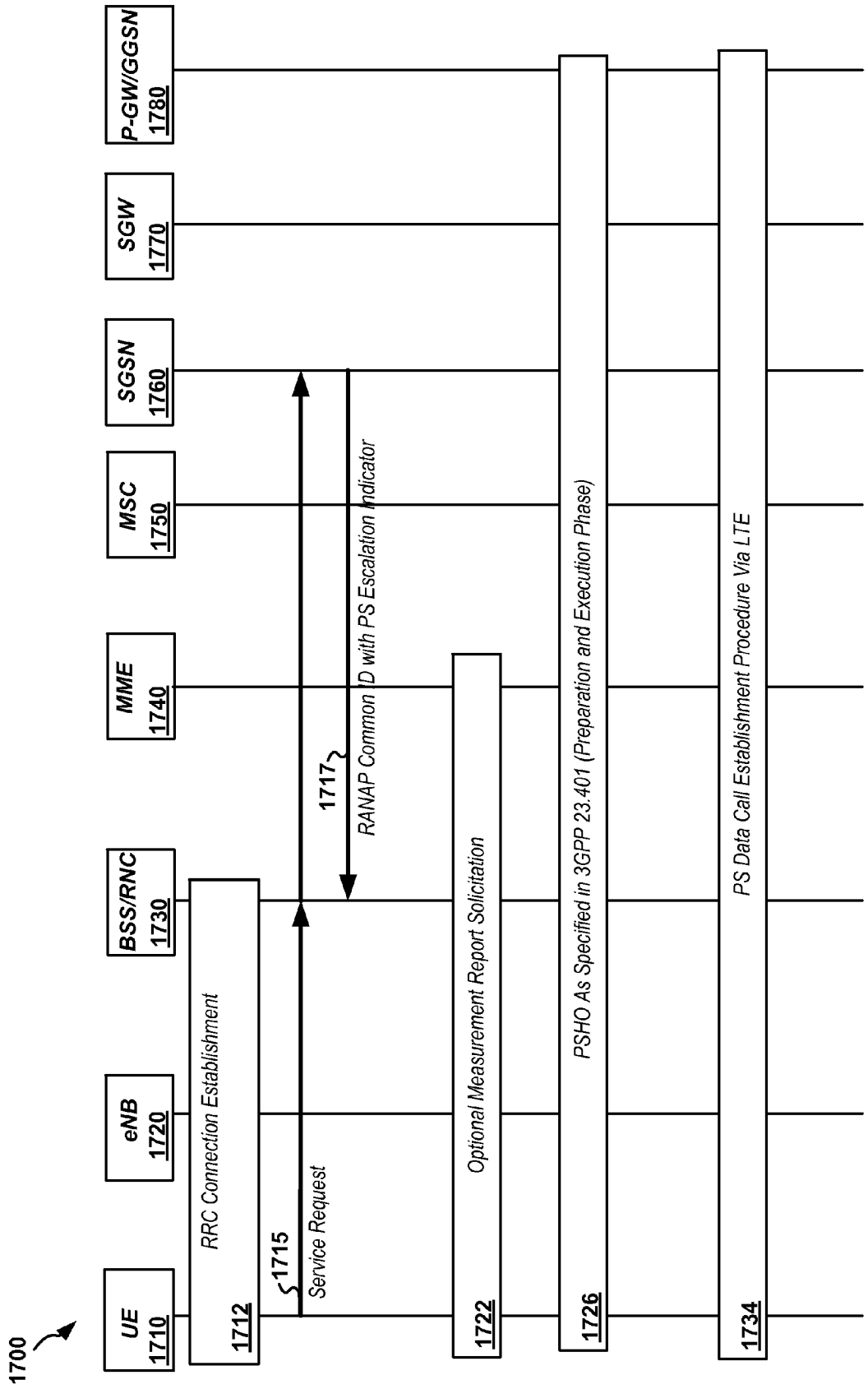
FIG. 17 illustrates details of an embodiment of an example connection workflow using PSHO-Based PS Escalation.

FIG. 17 illustrates another example of a process flow 1700 among a user terminal or UE 1710 in an Idle Mode camping on a 2G/3G cell such as described previously with respect to FIG. 1B. Procedure 1700 is similar to procedure 1600 except that a Packet Switched Handover (PSHO) procedure, such as defined in 3GPP TS 23.401, is used at stage 1726 rather than an RRC Release procedure as shown at stage 1623 of FIG. 16. At stage 1715, the UE 1710 may send a Service Request message to it's associated base station (BSS or RNS 1730) and to SGSN 1760. The SGSN may then send a RANAP CommonID with PS Escalation Indicator at stage 1717 to the BSS/RNC 1730. Other stages of FIG. 17 are the same as or analogous to corresponding stages shown in FIG. 16.

Figure 18:
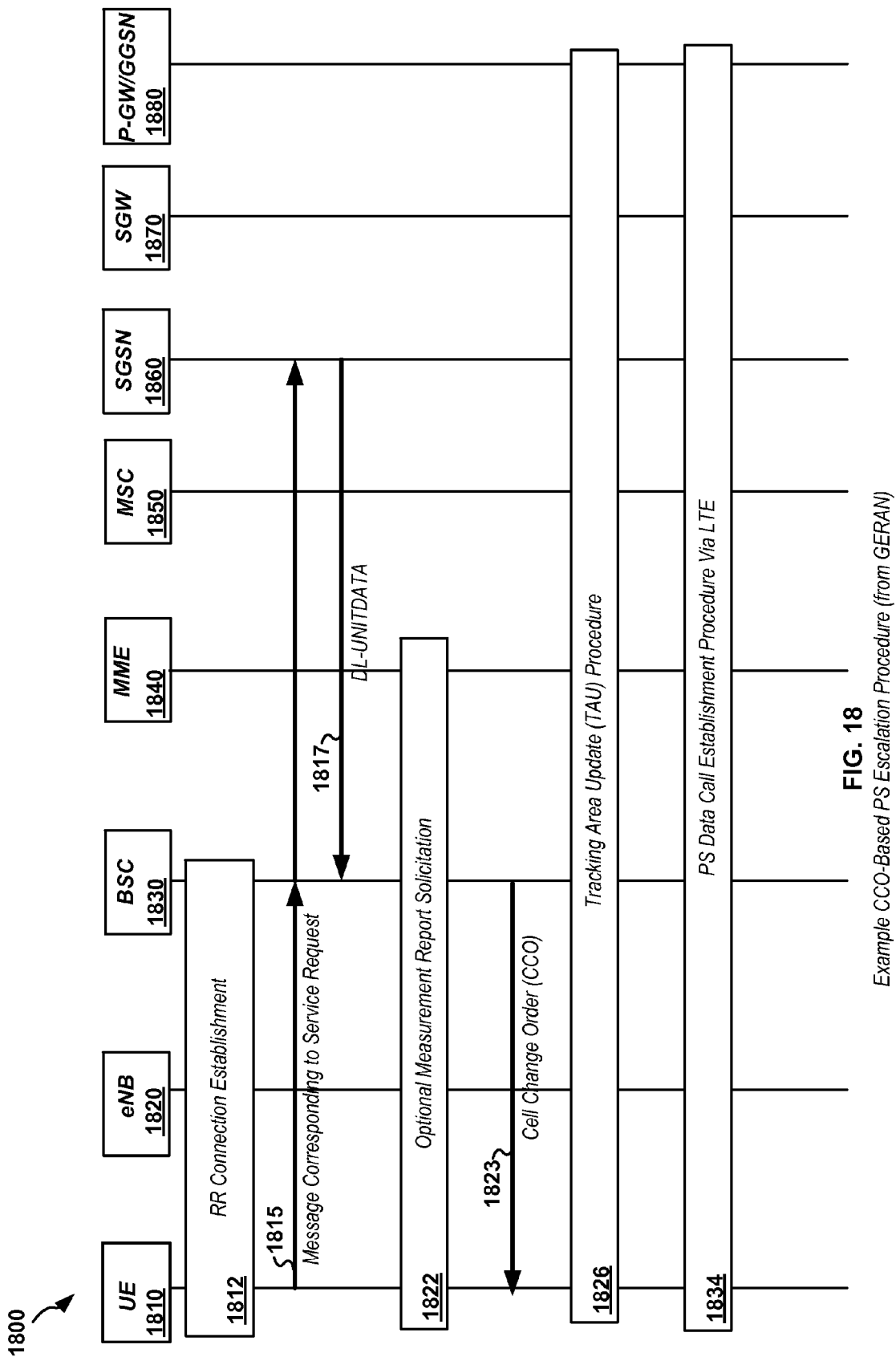
FIG. 18 illustrates details of an embodiment of an example connection workflow using CCO-Based PS Escalation in a GERAN network.

FIG. 18 illustrates another example of a process flow 1800 among a user terminal or UE 1810 in an Idle Mode camping on a GERAN cell such as described previously with respect to FIG. 1B. Process flow 1800 is similar to process flows 1600 and 1700 except that a Cell Change Order (CCO) procedure is used instead of an RRC Release or PSHO procedure. This procedure is applicable to GERAN networks. At stage 1815, a message corresponding to a Service Request is sent from UE 1810 to BSS 1830 and SGSN 1860. At stage 1817, the SGSN initiates direction of the UE to an E-UTRAN network (e.g., LTE network served by eNB 1820) and send a BSSGP DL-UNITDATA (Geran Network) message with a PS Escalation Indicator to BSC 1830. The BSS 1830 may then send a Cell Change Order (CCO) message at stage 1823 to UE 1810. Other stages of FIG. 18 are the same as or analogous to corresponding stages shown in FIGS. 16 and 17.

Figure 19:
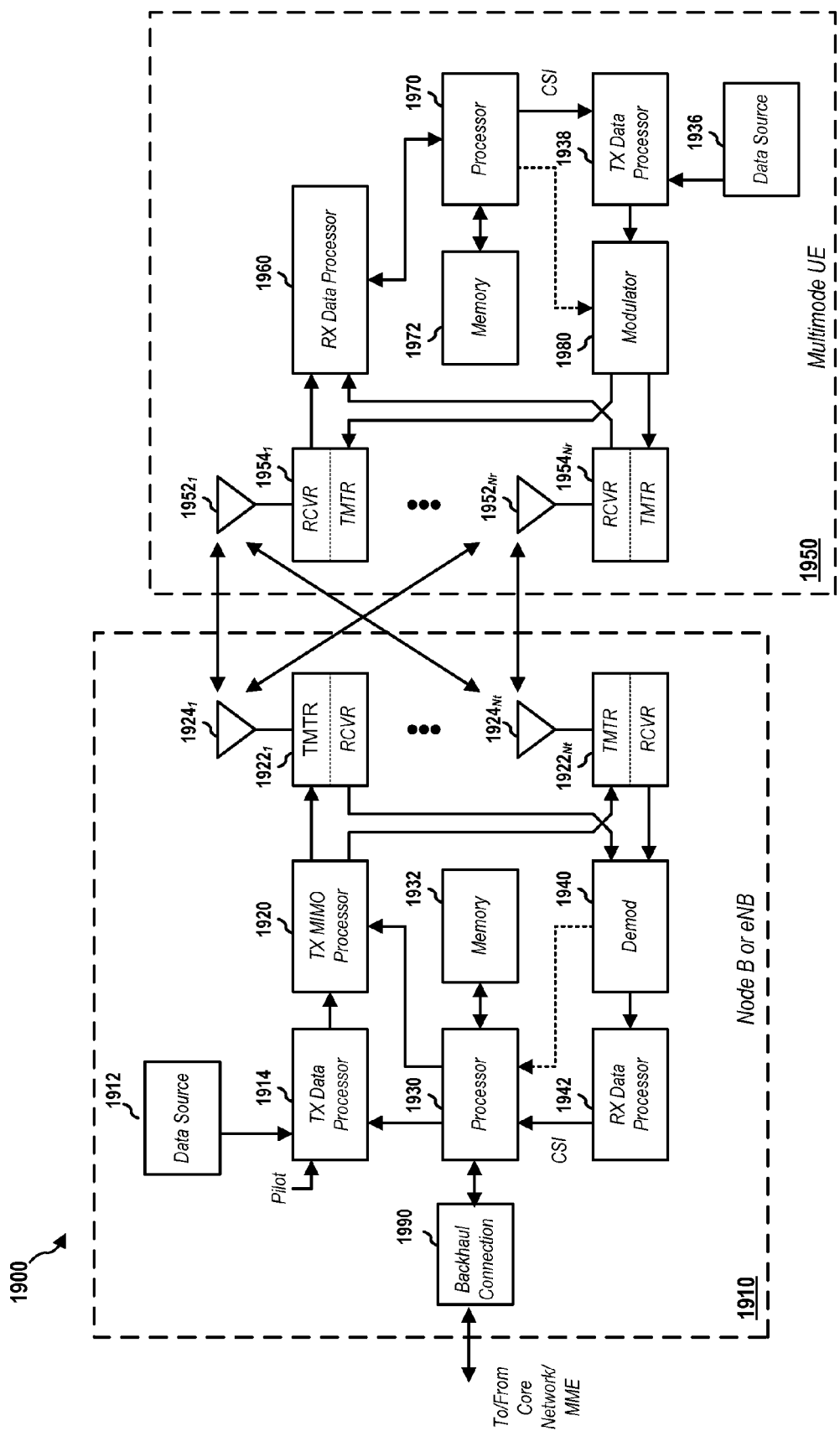
FIG. 19 illustrates an example embodiment of a base station and user terminal in a multimode communication system.

FIG. 19 illustrates a block diagram of an embodiment of base station 1910 (i.e., an NB, eNB, HeNB, etc.) and a user terminal 1950 (i.e., a terminal, AT or UE, etc.) in an example communication system 1900, on which aspects and functionality as described herein may be implemented. These components may correspond to those shown in FIGS. 3-7, and may be configured to implement the processes illustrated previously herein, such as described with respect to FIGS. 8-18.

Various functions may be performed in the processors and memories as shown in base station 1910 (and/or in other components not shown), such as coordination with other base stations (not shown) of other networks, to transmit and receive signaling from the other base stations and UEs, as well as to provide other functionality as described herein. For example, UE 1950 may include one or more modules to receive signals from base station 1910 and/or other base stations (not shown, such as non-serving base stations or base stations of other network types as described previously herein) to access base stations, facilitate handovers, receive DL signals, determine channel characteristics, perform channel estimates, demodulate received data and generate spatial information, determine power level information, and/or other information associated with base station 1910 or other base stations (not shown).

In one embodiment, base station 1910 may coordinate with other base stations, such as base stations of different network/RAT types, as described previously herein to facilitate multimode operation. This may be done in one or more components (or other components not shown) of base station 1910, such as processors 1914, 1930 and memory 1932. Base station 1910 may also include a transmit module including one or more components (or other components not shown) of eNB 1910, such as transmit modules 1924. Base station 1910 may include an interference cancellation module including one or more components (or other components not shown), such as processors 1930, 1942, demodulator module 1940, and memory 1932 to provide functionality such as redirection of served UEs, communication with associated MMEs, or other network nodes, signaling redirection information, PS to CS transition information, and/or other information such as is described herein.

Base station 1910 may include a processor module including one or more components (or other components not shown), such as processors 1930, 1914 and memory 1932 to perform base station functions as described herein and/or manage transmitter and/or receiver modules, which may be used to communicate with UEs or other nodes, such as MMEs, SGWs, or other nodes of the same or other network types. Base station 1910 may also include a control module for controlling receiver functionality. Base station 1910 may include a network connection module 1990 to provide networking with other systems, such as backhaul systems in the core network (CN), such as via backhaul connection module 1990, or with other components such as are shown or described with respect to FIGS. 1-7.

Likewise, UE 1950 may include a receive module including one or more components of UE 1950 (or other components not shown), such as receivers 1954. UE 1950 may also include a processor module including one or more components (or other components not shown) of UE 1950, such as processors 1960 and 1970, and memory 1972, to perform the processing functions associated with user terminals as described herein. This may include, for example, receiving and searching for redirection targets and alternate targets, as well as performing CS call setup procedures, RAU and TAU procedures, handovers to other networks, and/or other procedures as described previously herein.

In one embodiment, one or more signals received at UE 1950 are processed to receive DL signals and/or extract information such as SIB information from the DL signals. Additional processing may include estimating channel characteristics, power information, spatial information, and/or other information associated with base stations, such as base station 1910 and/or other base stations, such as Node Bs (not shown) or eNBs, to facilitating redirection commands, searching for and locating redirection targets and alternate targets, such as fallback targets, as well as facilitating communicating with other networks such as UTRAN and GERAN networks and associated nodes, such as base stations or Node Bs of those different network types.

UE 1950 may include one or more receiver and transmitter modules which may be configured for multimode operation so as to perform communication with LTE base stations as well as base stations of other types, such as base stations in UTRAN and/or GERAN networks. Memories 1932 and 1972 may be used to store computer code for execution on one or more processors, such as processors 1960, 1970 and 1938, to implement processes associated with the aspects and functionality described herein.

In operation, at the base station 1910, traffic data for a number of data streams may be provided from a data source 1912 to a transmit (TX) data processor 1914, where the data may be processed and transmitted to one or more UEs 1950. In one aspect, each data stream is processed and transmitted over a respective transmitter sub-system (shown as transmitters $1924_1$-$1924_{Nt}$) of base station 1910. TX data processor 1914 receives, formats, codes, and interleaves the traffic data for each data stream based on a particular coding scheme selected for that data stream so as to provide coded data. In particular, base station 1910 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 1914 as shown in FIG. 19 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 1930 based on instructions stored in memory 1932, or in other memory or instruction storage media of UE 1950 (not shown).

The modulation symbols for all data streams may then be provided to a TX MIMO processor 1920, which may further process the modulation symbols (e.g., for OFDM implementation). TX MIMO processor 1920 may then provide Nt modulation symbol streams to $N_t$ transmitters (TMTR) $1922_1$ through $1922_{Nt}$. The various symbols may be mapped to associated RBs for transmission.

TX MIMO processor 1930 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 ... $b_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as B1x1+ B2x2+$BN_SxN_S$, where $N_S$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $1922_1$ through $1922_{Nt}$ receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters $1922_1$ through $1922_{Nt}$ are then transmitted from $N_t$ antennas $1924_1$ through $1924_{Nt}$, respectively.

At UE 1950, the transmitted modulated signals are received by $N_r$ antennas $1952_1$ through $1952_{Nr}$ and the received signal from each antenna 1952 is provided to a respective receiver (RCVR) $1954_1$ through $1952_{Nr}$. Each receiver 1954 conditions (e.g., filters, amplifies and downconverts) a respective received signal, digitizes the conditioned signal to provide samples, and further processes the samples to provide a corresponding "received" symbol stream.

An RX data processor 1960 then receives and processes the $N_r$ received symbol streams from $N_r$ receivers $1954_1$ through $1952_{Nr}$ based on a particular receiver processing technique so as to provide $N_S$ "detected" symbol streams so at to provide estimates of the $N_S$ transmitted symbol streams. The RX data processor 1960 then demodulates, deinterleaves, and decodes each detected symbol stream to recover the traffic data for the data stream. The processing by RX data processor 1960 is typically complementary to that performed by TX MIMO processor 1920 and TX data processor 1914 in base station 1910.

A processor 1970 may periodically determine a precoding matrix for use as is described further below. Processor 1970 may then formulate a reverse link message that may include a matrix index portion and a rank value portion. In various aspects, the reverse link message may include various types of information regarding the communication link and/or the received data stream. The reverse link message may then be processed by a TX data processor 1938, which may also receive traffic data for a number of data streams from a data source 1936 which may then be modulated by a modulator 1980, conditioned by transmitters $1954_1$ through $1954_{Nr}$, and transmitted back to base station 1910. Information transmitted back to base station 1910 may include power level and/or spatial information for providing beamforming to mitigate interference from base station 1910.

At base station 1910, the modulated signals from UE 1950 are received by antennas 1924, conditioned by receivers 1922, demodulated by a demodulator 1940, and processed by a RX data processor 1942 to extract the message transmitted by UE 1950. Processor 1930 then determines which precoding matrix to use for determining beamforming weights, and then processes the extracted message.

Figure 20:
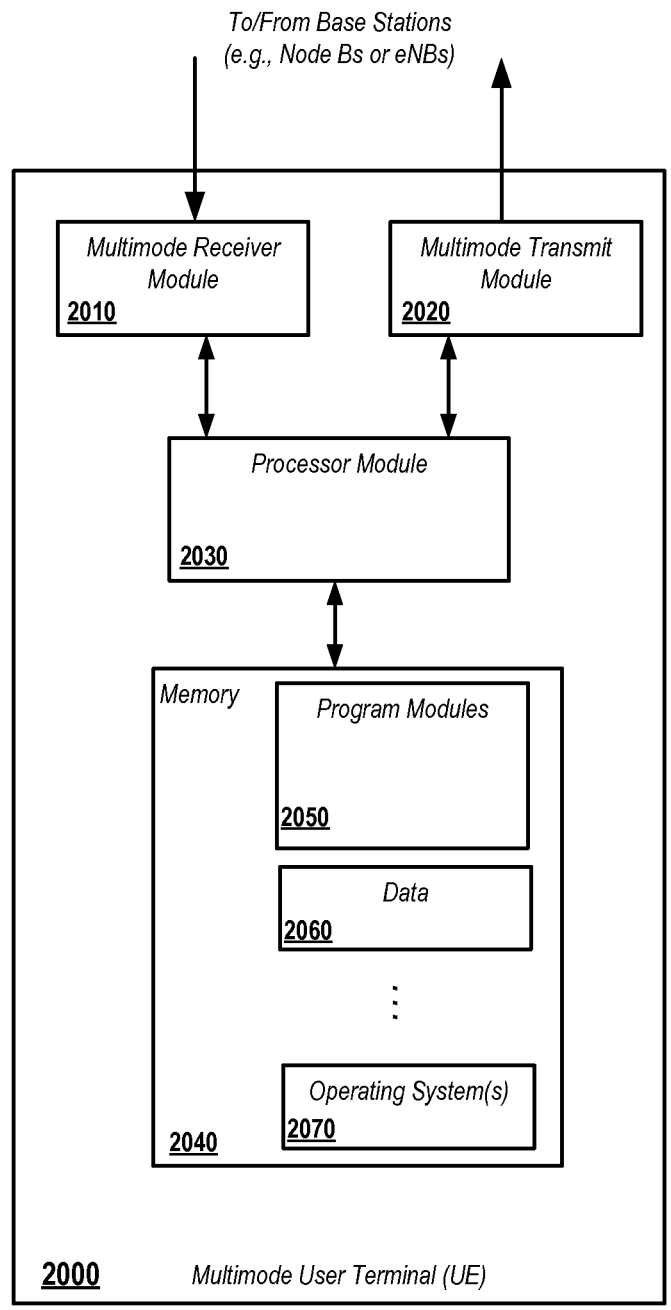
FIG. 20 illustrates details of an embodiment of a user terminal that may be used in a multimode communications system.

FIG. 20 illustrates additional details of an embodiment of a communications apparatus 2000, which may be a user terminal or component of a user terminal, such as a multimode UE as described herein. Apparatus 2000 may include one or more multimode receiver modules 2010 which may be configured to receive signals from multiple network types, such as LTE networks, UTRAN networks, GERAN networks, and/or other networks. Likewise, apparatus 2000 may include one or more transmitter modules 2020 which may be configured for similar multimode capability. Apparatus 2000 may include one or more processor modules 2030 which may be configured to implement the processing described herein. Apparatus 2000 may also include one or more memory spaces 2040, which may include program modules 2050, data 2060, one or more operating systems 2070, as well as other memory storage capabilities (not shown). Memory space 2000 may comprise multiple physical memory devices, such as flash, DRAM, SRAM, optical storage, and/or other memory or storage technologies.

Program module 2000 may include modules, such as described herein, to perform user terminal functions such as executing applications, receive and responding to triggers to move to or from E-UTRAN/LTE networks, responding to PS escalation requests, detecting failures to access targets, such as redirection targets, accessing fallback targets, performing RAU and TAU procedures, performing CS setup procedures, and/or performing other functions or processes as are described previously herein. Program modules 2050 may be configured to perform these various functions in conjunction with processor modules 2030, receiver and transmitter modules 2020, and/or other modules (not shown). Data 2060 may include data associated with execution of program modules 2050, which may be implemented by or in conjunction with operation system(s) 2070.

Figure 21:
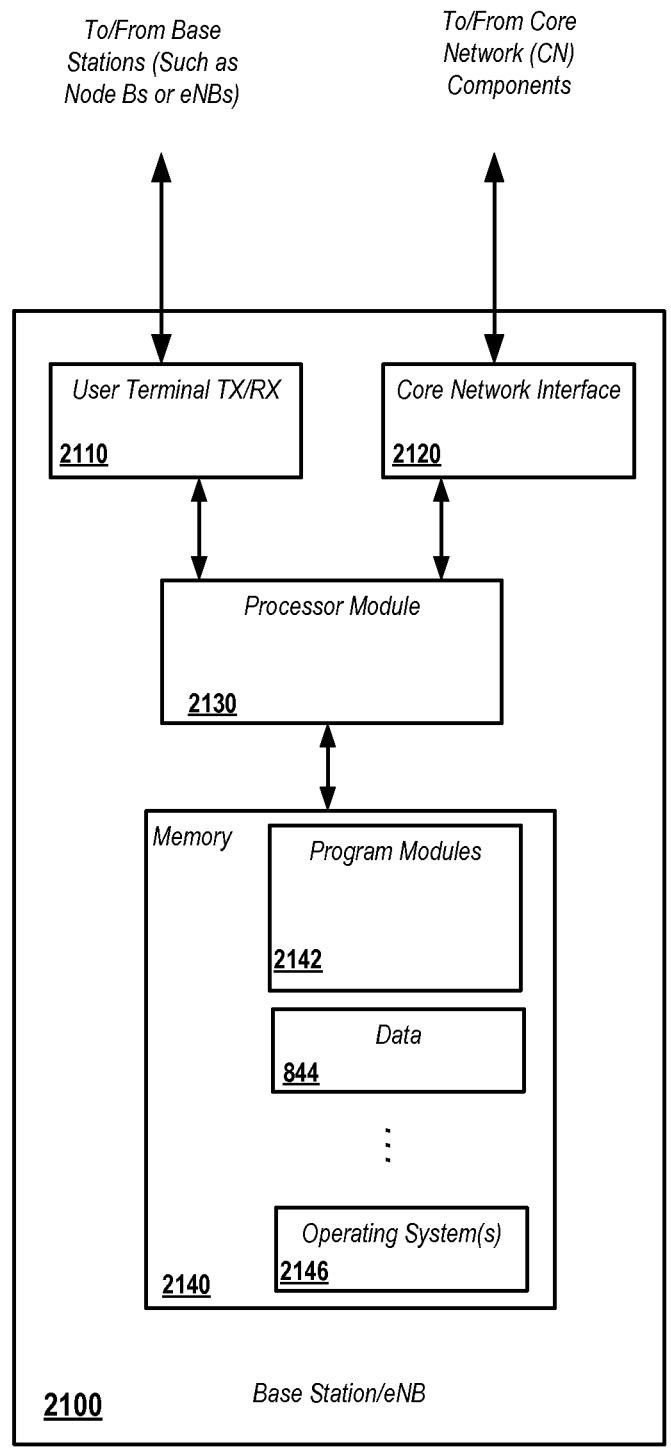
FIG. 21 illustrates details of an embodiment of a base station that may be used in a multimode communication system.

FIG. 21 illustrates additional details of an embodiment of a communications apparatus 2100, which may be a base station, such as a Node B (NB) or eNB as described herein. Apparatus 2100 may include one or more transmit and receive modules (collectively shown as a transceiver module 2110), for communicating with served nodes such as user terminals or UEs. Apparatus 2100 may also include one or more Core Network (CN) modules configured to communicate with core network components, such as MMEs, SGWs, etc. Apparatus 2100 may include one or more processor modules 2130 which may be configured to implement the processing associated with various types of base stations as described previously herein. Apparatus 2100 may also include one or more memory spaces 2140, which may include program modules 2150, data 2160, one or more operating systems 2170, as well as other memory storage capabilities (not shown). Memory space 2140 may comprise multiple physical memory devices, such as flash, DRAM, SRAM, optical storage, and/or other memory or storage technologies.

Program module 2150 may include modules, such as described herein, to perform base station functions such as responding to requests from UEs to move to PS connections, such as from GERAN or UTRAN networks to E-UTRAN/LTE networks, coordination and providing redirection requests, coordination PS suspension with other network components, such as MMEs, SGWs, etc., as well as performing other base station functions such as are described herein.

Program modules 2150 may be configured to perform these various functions in conjunction with processor module(s) 2130, transceiver modules 2110, core network modules 2120, and/or other modules (not shown). Data 2160 may include data associated with execution of program modules 2150, which may be implemented by or in conjunction with operation system(s) 2170.

In some configurations, the apparatus for wireless communication includes means for performing various functions as described herein. In one aspect, the aforementioned means may be a processor or processors and associated memory in which embodiments reside, such as are shown in FIG. 19, and which are configured to perform the functions recited by the aforementioned means. The may be, for example, modules or apparatus residing in UEs, NBs, eNBs, MMEs, SGWs or other gateways, MSCs, and/or other network nodes such as are shown herein, such as in FIGS. 1-7 and 19, to perform the multimode functions as are described herein, such as in processes or methods as described with respect to FIGS. 8-18. In another aspect, the aforementioned means may be a module or any apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, processors may be processors, such as communication processors, specifically designed for implementing functionality in communication devices or other mobile or portable devices.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

We claim:

1. A method for providing inter-radio access technology (RAT) mobility in a wireless communication system, the method comprising:
camping a user terminal in an Idle mode in a first wireless network cell, wherein the first wireless network is a GERAN or UTRAN network;
changing, based on an application executing on the user terminal, a user terminal usage mode from a Voice Centric mode to a Data Centric mode;
initiating a Routing Area Update (RAU) procedure from the user terminal, the RAU procedure including:
providing information associated with the usage mode change from the user terminal; and
receiving new Cell Priority Information from the wireless network;
selecting an E-UTRAN cell; and
performing data communications associated with the application with a base station of the E-UTRAN cell.

2. The method of claim 1, wherein the first wireless network cell is a GERAN cell and the E-UTRAN cell is an LTE cell.

3. The method of claim 1, wherein the first wireless network cell is a UTRAN cell and the E-UTRAN cell is an LTE cell.

4. The method of claim 1, wherein the user terminal is a UE and the base station of the E-UTRAN cell is an LTE eNB.

5. The method of claim 1, wherein the selecting an E-UTRAN cell is initiated before receipt of the new Cell Priority Information.

6. The method of claim 5, wherein the selecting an E-UTRAN cell is initiated responsive to the change in usage mode on the user terminal.

7. The method of claim 5, wherein the usage mode is changed by the application.

8. The method of claim 1, further comprising changing the user terminal usage mode from the Data Centric Mode to the Voice Centric mode after completion of the data communications.

9. The method of claim 8, further comprising:
initiating, from the user terminal, a Tracking Area Update (TAU) procedure; and selecting, responsive to new information received in the TAU procedure, a second wireless network cell, wherein the second wireless network cell is a GERAN or UTRAN cell.

10. The method of claim 9, further comprising camping the user terminal on the second wireless network cell.

11. A computer program product comprising a non-transitory computer-readable medium including codes for causing a computer to:
camp a user terminal in an Idle mode in a first wireless network cell, wherein the first wireless network is a GERAN or UTRAN network;
change, based on an application executing on the user terminal, a user terminal usage mode from a Voice Centric mode to a Data Centric mode;
initiate a Routing Area Update (RAU) procedure from the user terminal, the RAU procedure including:
providing information associated with the user terminal usage mode change from the user terminal; and
receiving new Cell Priority Information from the wireless network;
select an E-UTRAN cell; and
perform data communications associated with the application with a base station of the EUTRAN cell.

12. The computer program product of claim 11, wherein the first wireless network cell is a GERAN cell and the E-UTRAN cell is an LTE cell.

13. The computer program product of claim 11, wherein the first wireless network cell is a UTRAN cell and the E-UTRAN cell is an LTE cell.

14. The computer program product of claim 11, wherein the user terminal is a UE and the base station of the E-UTRAN cell is an LTE eNB.

15. The computer program product of claim 11, wherein the codes include codes for causing the computer to select the E-UTRAN wireless network cell before receipt of the new Cell Priority Information.

16. The computer program product of claim 15, wherein the codes include codes for causing the computer to select the E-UTRAN cell in response to the change in usage mode on the user terminal.

17. The computer program product of claim 15, wherein the usage mode is changed by the application.

18. The computer program product of claim 11, further comprising codes for causing the computer to change the usage mode on the user terminal from the Data Centric Mode to the Voice Centric mode after completion of the data communications.

19. The computer program product of claim 18, further including codes for causing the computer to:
  initiate, from the user terminal, a Tracking Area Update (TAU) procedure; and
  select, responsive to new information received in the TAU procedure, a second wireless network cell, wherein the second wireless network cell is a GERAN or UTRAN cell.

20. The computer program product of claim 19, wherein the codes further include codes for causing the computer to camp the user terminal on the second wireless network cell.

21. A multi-network communications device, comprising:
  a receiver module configured to receive signals from a first wireless network cell and camp a user terminal in an Idle mode on the first wireless network cell, wherein the first wireless network cell is a GERAN or UTRAN cell;
  a processor module configured to change, based on an application executing on the user terminal, a user terminal usage mode from a Voice Centric mode to a Data Centric mode; and
  a transmitter module configured to:
  initiate a Routing Area Update (RAU) procedure from the user terminal, the RAU procedure including providing information associated with the usage mode change from the user terminal;
  wherein the receiver module is further configured to receive new Cell Priority Information from the first wireless network; and
  wherein the processor module is configured to select an E-UTRAN wireless network cell; and
  wherein the transmitter and receiver modules are configured to perform data communications associated with the application with a base station of the selected E-UTRAN wireless network cell.

22. The communications device of claim 21, wherein the first wireless network cell is a GERAN cell and the E-UTRAN cell is an LTE cell.

23. The communications device of claim 21, wherein the first wireless network cell is a UTRAN cell and the E-UTRAN cell is an LTE cell.

24. The communications device of claim 21, wherein the user terminal is a UE and the base station of the E-UTRAN cell is an LTE eNB.

25. The communications device of claim 21, wherein the processor module is configured to select the E-UTRAN wireless network cell before receipt of the new Cell Priority Information.

26. The communications device of claim 25, wherein the processor module is configured to select the E-UTRAN wireless network cell in response to the change in usage mode on the user terminal.

27. The communications device of claim 25, wherein the device mode is changed by the application.

28. The communications device of claim 21, wherein the processor module is further configured to change the usage mode on the user terminal from the Data Centric Mode to the Voice Centric mode after completion of the data communications.

29. The communications device of claim 28, wherein the transmitter module is further configured to initiate, from the user terminal, a Tracking Area Update (TAU) procedure; and wherein the processor module is further configured to select, responsive to new information received in the TAU procedure, a second wireless network cell, wherein the second wireless network cell is a GERAN or UTRAN cell.

30. The communications device of claim 29, wherein the receiver module is further configured to receive signals from and camp the user terminal on the second wireless network cell.

* * * * *